United States Patent
Jinnouchi

(10) Patent No.: US 12,225,326 B2
(45) Date of Patent: Feb. 11, 2025

(54) INFORMATION PROCESSING APPARATUS, INFORMATION PROCESSING METHOD, AND PROGRAM

(71) Applicant: Sony Group Corporation, Tokyo (JP)

(72) Inventor: Ryo Jinnouchi, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 163 days.

(21) Appl. No.: 17/927,245

(22) PCT Filed: Jun. 11, 2021

(86) PCT No.: PCT/JP2021/022389
§ 371 (c)(1),
(2) Date: Nov. 22, 2022

(87) PCT Pub. No.: WO2022/014226
PCT Pub. Date: Jan. 20, 2022

(65) Prior Publication Data
US 2023/0209015 A1 Jun. 29, 2023

(30) Foreign Application Priority Data

Jul. 13, 2020 (JP) ................................. 2020-120119

(51) Int. Cl.
*H04N 7/18* (2006.01)
*H04N 5/268* (2006.01)

(52) U.S. Cl.
CPC ............. *H04N 7/181* (2013.01); *H04N 5/268* (2013.01)

(58) Field of Classification Search
CPC ........ H04N 7/181; H04N 5/268; H04N 23/90; H04N 23/661
See application file for complete search history.

(56) References Cited

U.S. PATENT DOCUMENTS

| 8,363,102 | B1* | 1/2013 | Kadoch | H04W 4/90 348/148 |
| 8,893,164 | B1* | 11/2014 | Teller | G06Q 30/0252 725/12 |
| 8,910,217 | B2* | 12/2014 | Tjio | H04N 21/2187 725/62 |
| 2007/0121153 | A1 | 5/2007 | Shinkai | |

(Continued)

FOREIGN PATENT DOCUMENTS

| JP | 2007150781 A | 6/2007 |
| JP | 2008196891 A | 8/2008 |

(Continued)

OTHER PUBLICATIONS

International Search Report (PCT/ISA/210), International Application No. PCT/JP2021/022389, dated Sep. 7, 2021.

*Primary Examiner* — Michael B. Pierorazio
(74) *Attorney, Agent, or Firm* — Michael Best & Friedrich LLP

(57) ABSTRACT

An information processing apparatus includes a control unit that performs: situation determination processing of determining whether or not a situation related to an imaging operation in an imaging device is a situation suitable for image transmission; and selection processing of selecting an imaging device to be caused to transmit a captured image among a plurality of imaging devices on the basis of the situation determination processing.

13 Claims, 17 Drawing Sheets

(56) References Cited

U.S. PATENT DOCUMENTS

| | | | | |
|---|---|---|---|---|
| 2007/0162487 A1* | 7/2007 | Frailey | H04N 19/40 | 707/999.102 |
| 2009/0087161 A1* | 4/2009 | Roberts | H04N 5/262 | 386/285 |
| 2009/0148124 A1* | 6/2009 | Athsani | H04N 21/6582 | 386/241 |
| 2009/0204885 A1* | 8/2009 | Ellsworth | G06F 16/44 | 707/999.1 |
| 2010/0002084 A1* | 1/2010 | Hattori | H04N 23/67 | 348/207.1 |
| 2010/0075685 A1* | 3/2010 | Axnas | H04L 1/0041 | 455/450 |
| 2010/0254295 A1* | 10/2010 | Ahn | H04N 21/631 | 370/312 |
| 2012/0020307 A1* | 1/2012 | Henderson | H04L 41/0886 | 370/329 |
| 2012/0040714 A1* | 2/2012 | Wu | H04B 1/3877 | 455/552.1 |
| 2012/0075168 A1* | 3/2012 | Osterhout | G06F 3/017 | 345/8 |
| 2012/0192242 A1* | 7/2012 | Kellerer | G06F 16/787 | 725/116 |
| 2012/0229655 A1* | 9/2012 | Solomon | H04N 23/60 | 348/207.1 |
| 2013/0104173 A1* | 4/2013 | Tjio | H04N 21/6131 | 725/62 |
| 2014/0157336 A1* | 6/2014 | Deegan | H04N 21/8173 | 725/91 |
| 2014/0362246 A1 | 12/2014 | Nakano | | |
| 2016/0323559 A1 | 11/2016 | Matsunobu | | |
| 2020/0098122 A1* | 3/2020 | Dal Mutto | G06T 17/00 | |
| 2020/0288171 A1* | 9/2020 | Hannuksela | H04N 19/124 | |

FOREIGN PATENT DOCUMENTS

| | | |
|---|---|---|
| JP | 2014239318 A | 12/2014 |
| JP | 2016213808 A | 12/2016 |
| WO | 2012124230 A1 | 9/2012 |

* cited by examiner

INFORMATION PROCESSING APPARATUS, INFORMATION PROCESSING METHOD, AND PROGRAM

TECHNICAL FIELD

The present technology relates to an information processing apparatus, an information processing method, and a program, and particularly relates to a control technology related to image transmission from a plurality of imaging devices.

BACKGROUND ART

It is common to transmit an image (a still image or a moving image) captured by an imaging device to another device, for example, a computer device such as a cloud server.

Patent Document 1 below discloses a technique related to transmission of image data and metadata.

CITATION LIST

Patent Document

Patent Document 1: Japanese Patent Application Laid-Open No. 2007-150781

SUMMARY OF THE INVENTION

Problems to be Solved by the Invention

For example, for the purpose of reporting by television broadcasting, web distribution, and the like, there is a case where an image is delivered by uploading a captured still image or moving image to an external server device immediately after a camera operator captures an image at a site such as a sports venue or an event venue.

In recent years, for example, as called a multi-camera system, a plurality of imaging devices is arranged in a sports venue and the like, imaging is performed at various angles and angles of view, and these images are transmitted.

Furthermore, in a fixed point camera (live camera), a monitoring camera, and the like, a plurality of imaging devices may be arranged at a certain target place, and imaging may be performed at various angles and distances, for example.

In a case where the plurality of imaging devices is used in this manner, if images are always transmitted from all the imaging devices to the server device, or if all the imaging devices are always set to an operating state, there may be an undesirable case where the processing load increases and image waste increases.

Therefore, the present disclosure proposes a technology for selecting an appropriate imaging device and transmitting an image in a case where imaging by a plurality of imaging devices is possible.

Solutions to Problems

An information processing apparatus according to the present technology includes a control unit that performs: situation determination processing of determining whether or not a situation related to an imaging operation in an imaging device is a situation suitable for image transmission; and selection processing of selecting an imaging device to be caused to transmit a captured image among a plurality of imaging devices on the basis of the situation determination processing.

For example, an information processing apparatus capable of transmitting and receiving images and other information to and from an imaging device is assumed. The information processing apparatus can receive an image from each of the plurality of imaging devices. In this case, it is possible to determine the situation of each of the imaging devices and select from which imaging device the captured image is transmitted.

In the above-described information processing apparatus according to the present technology, it is conceivable that the control unit performs the situation determination processing on an imaging device being selected as a device that performs captured image transmission, and performs, in a case where it is determined that the imaging device is not in a situation suitable for image transmission, the selection processing such that the imaging device that performs image transmission is switched to another imaging device among the plurality of imaging devices.

For example, in a state where a certain imaging device is selected as a device that performs captured image transmission on the basis of the selection processing, the situation of the imaging device is confirmed, and whether or not the imaging device is in a situation suitable for continuation of image transmission is confirmed.

In the above-described information processing apparatus according to the present technology, it is conceivable that the control unit makes an information request to the imaging device, and performs the situation determination processing on the basis of information transmitted from the imaging device in response to the information request.

That is, the information used for the determination processing is requested from a side of the information processing apparatus to the imaging device.

In the above-described information processing apparatus according to the present technology, it is conceivable that the control unit performs the situation determination processing on the basis of notification information from an imaging device being selected as a device that performs captured image transmission.

That is, a side of the imaging device transmits the notification information to the information processing apparatus as necessary, as periodic timing, and the like. The information processing apparatus performs the situation determination processing for the imaging device that is transmitting an image according to the notification information.

In the above-described information processing apparatus according to the present technology, it is conceivable that the control unit performs the situation determination processing on two or more imaging devices among the plurality of imaging devices, and selects, in the selection processing, an imaging device to be caused to transmit a captured image from the plurality of imaging devices on the basis of the situation determination processing and designation information related to imaging.

The designation information related to imaging is assumed to be, for example, information for designating various conditions related to imaging such as an imaging position, a direction, an angle of view, a person or an article as a subject, a date and time, a scenery, and brightness.

In the above-described information processing apparatus according to the present technology, it is conceivable that the designation information is information of a position as a subject.

For example, selection for imaging a subject at a specific position is performed.

In the above-described information processing apparatus according to the present technology, it is conceivable that the designation information is information for designating an imaging target.

For example, an appropriate imaging device for imaging a specific person and the like as an imaging target is selected.

In the above-described information processing apparatus according to the present technology, it is conceivable to determine a power supply situation of the imaging device in the situation determination processing.

For example, a situation of a remaining amount of a battery of the imaging device, whether it is an external power supply/battery, and the like is determined.

In the above-described information processing apparatus according to the present technology, it is conceivable to determine a failure status of the imaging device in the situation determination processing.

For example, it is determined whether or not any trouble has occurred in the imaging device.

In the above-described information processing apparatus according to the present technology, it is conceivable to determine a situation of the recording medium of the imaging device in the situation determination processing.

For example, a recordable capacity of the recording medium in the imaging device, a defect of the recording medium, and the like are determined.

In the above-described information processing apparatus according to the present technology, it is conceivable to determine a situation of the imaging environment of the imaging device in the situation determination processing.

For example, an amount of light and weather at a place where the imaging device is disposed are determined.

In the above-described information processing apparatus according to the present technology, it is conceivable to determine a situation of the distance to an imaging target of the imaging device in the situation determination processing.

For example, a situation of a distance from a place where the imaging device is disposed to a specific subject is determined, and an appropriate imaging device is selected. Alternatively, an appropriate imaging device is selected from a relationship between a function of the imaging device and the distance.

In the above-described information processing apparatus according to the present technology, it is conceivable to determine a conformity situation between a captured image of the imaging device and a communication speed in the situation determination processing.

For example, the imaging device 1 having a suitable captured image size can be determined according to a communication situation of the network.

In the above-described information processing apparatus according to the present technology, it is conceivable to determine a situation of an imaging direction or an imaging angle of view of the imaging device in the situation determination processing.

It is possible to determine whether or not a situation is suitable for imaging of a predetermined subject according to the imaging direction or the angle of view of the imaging device.

In an information processing method of the present technology, an information processing apparatus performs: situation determination processing of determining whether or not a situation related to an imaging operation in an imaging device is a situation suitable for image transmission; and selection processing of selecting an imaging device to be caused to transmit a captured image among a plurality of imaging devices on the basis of the situation determination processing.

Therefore, an imaging device in an appropriate situation is selected, and image transmission is performed.

A program according to the present technology is a program that causes an information processing apparatus to execute the above-described situation determination processing and selection processing. This facilitates implementation of the information processing apparatus described above.

MODE FOR CARRYING OUT THE INVENTION

Hereinafter, embodiments will be described in the following order.

<1. System configuration>
<2. Configurations of imaging device, server device, and client terminal>
<3. First and second embodiments>
<4. Third and fourth embodiments>
<5. Fifth and sixth embodiments>
<6. Summary and modification examples>

1. System Configuration

Figure 1:
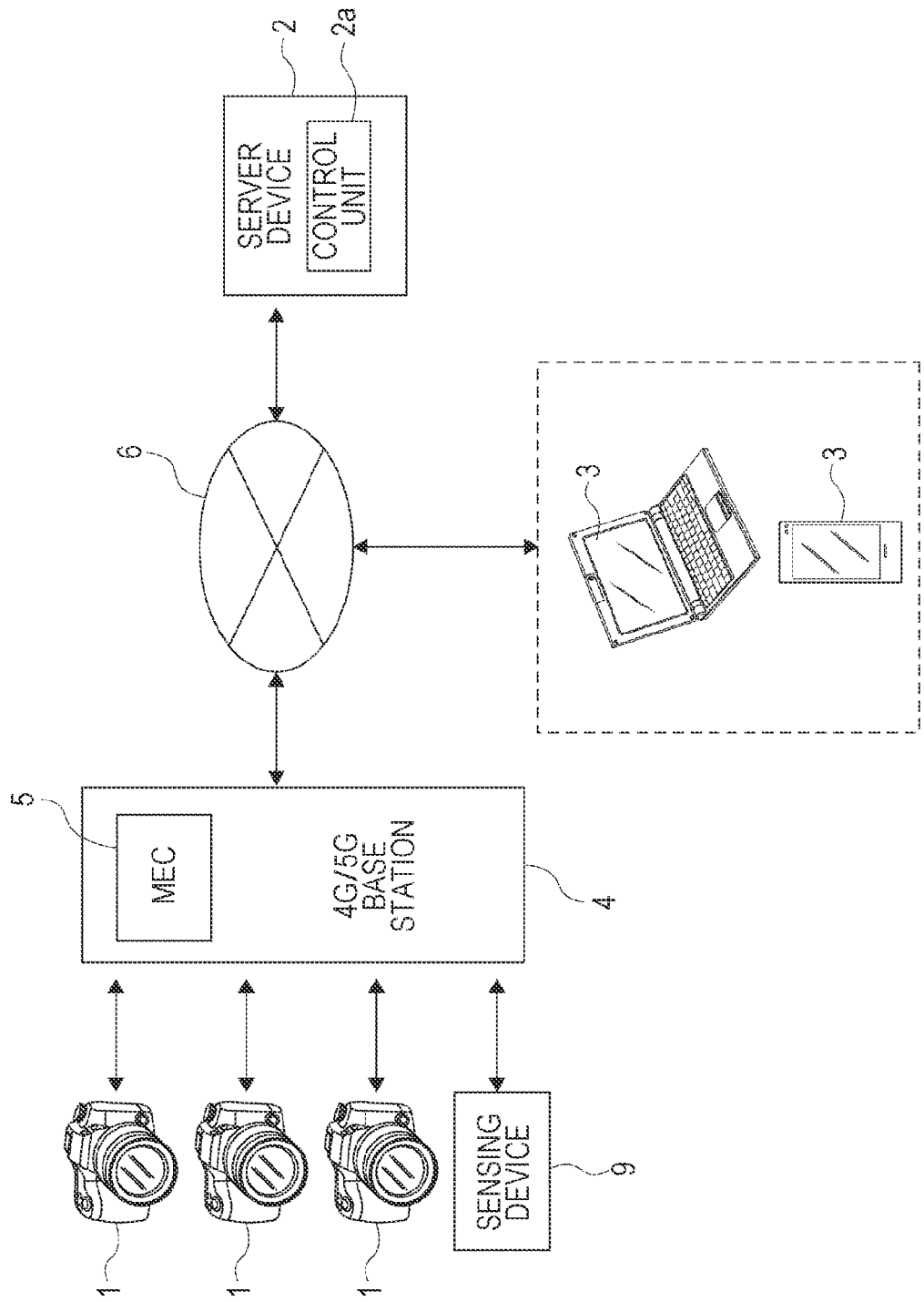
FIG. 1 is an explanatory diagram of a system configuration according to an embodiment of the present technology.

FIG. 1 illustrates a system configuration example of an embodiment. This system is a system in which a plurality of imaging devices 1 can transmit images and the like to a server device 2, and for example, the plurality of imaging devices 1, the server device 2, and a client terminal 3 can communicate via a network 6.

Note that, in the present disclosure, the term "image" includes a still image and a moving image.

As the imaging device 1, various imaging devices as a video camera and a still camera are assumed. The illustrated imaging device 1 may be assumed to be a camera that a professional photographer captures in a sports or event venue, or may be, for example, a surveillance camera, a fixed point camera, and the like. In addition to work, a camera used for imaging by a general user may be assumed. The use case is not particularly limited.

Each imaging device 1 can transmit information such as an image to the server device 2 by, for example, file transfer protocol (FTP) communication.

The image uploaded from the imaging device 1 to the server device 2 may be in a situation of being converted into a file in a format such as joint photographic experts group (JPEG), or may be binary information that is not converted into a file such as RGB data. In particular, the data format is not limited.

Note that, in the present disclosure, a "captured image" refers to an image captured by the imaging device 1. Therefore, an image captured and recorded on the recording medium is also included in the "captured image".

For example, both an image captured by the imaging device 1 and transmitted to the outside without being recorded in the recording medium in the imaging device 1 and an image read from the recording medium and transmitted to the outside after being recorded in the recording medium captured in the imaging device 1 are captured image transmission.

Both the server device 2 and the client terminal 3 are information processing apparatuses including computer equipment. However, since the server device 2 provides a service for image transfer and the client terminal 3 is an information processing apparatus of a customer who uses a transfer service by the server device 2, the server device 2 and the client terminal 3 are referred to as a "server device" and a "client terminal" for distinction in the present disclosure.

The server device 2 is assumed to be a device that functions as a so-called cloud server. Of course, it is not limited to the aspect as a cloud server.

Although a control unit 2a is illustrated in the server device 2, the control unit 2a executes situation determination processing, selection processing, and the like as described later.

The server device 2 stores an image and the like uploaded from the imaging device 1, provides the image and the like to the client terminal 3, and exchanges other information.

The client terminal 3 indicates an information processing apparatus to which a camera operator delivers an image, such as a broadcasting station, a newspaper company, or a communication company. Note that the broadcast station and the like are examples, and the delivery destination is not limited.

As the network 6, for example, the Internet, a home network, a local area network (LAN), a satellite communication network, and various other networks are assumed.

In the example of FIG. 1, the imaging device 1 communicates with the server device 2 via a base station 4. The base station 4 is, for example, a base station of 4G communication (fourth generation mobile communication system) and 5G communication (fifth generation mobile communication system).

A mobile edge computing (MEC) 5 may be deployed in the base station 4. Communication of each imaging device 1 may be performed through processing of the MEC 5, or some functions of the server device 2 may be executed by the MEC 5.

The sensing device 9 collectively illustrates various sensor devices arranged in, for example, an event venue where the imaging device 1 is arranged. It is assumed that the sensing device 9 can transmit the detected information to the server device 2.

As the sensing device 9, for example, a sensor device such as illuminance, weather, temperature, humidity, wind volume, wind direction, and the like in the vicinity of the imaging device 1 is assumed. Furthermore, a sensor capable of detecting an audio (volume), a sensor capable of analyzing contents of a sound, a position sensor, and the like are also conceivable.

Although the sensing device 9 is illustrated separately from the imaging device 1, the sensing device 9 may be built in the imaging device 1.

By constructing the multi-camera-based image transmission system as illustrated in FIG. 1, for example, images captured by the plurality of imaging devices 1 can be transferred to the client terminal 3 via the server device 2, and a side of the client terminal 3 can use the images for broadcasting and distribution, or use the images for news coverage, for example. Of course, a purpose of simply viewing on the client terminal 3 or a monitoring purpose is also conceivable.

However, if an image from the imaging device 1 arranged as a multi-camera is always transmitted, a network load or a processing load of each unit may increase. Furthermore, even if a large amount of images are provided, it takes time and effort to select images in the client terminal 3, and the usability of the images may deteriorate or the rapidity of reporting may be impaired.

Therefore, in the present embodiment, the server device 2 selects (including switching) an imaging device suitable for image transmission in the multi-camera system, and realizes a reduction in a load of network communication, a storage capacity load, facilitation of selection work, and the like. Moreover, an image having image contents suitable for the situation is transmitted.

2. Configurations of Imaging Device, Server Device, Client Terminal, and MEC

Hereinafter, configuration examples of the imaging device 1, the server device 2, and the client terminal 3 will be described.

Figure 2:
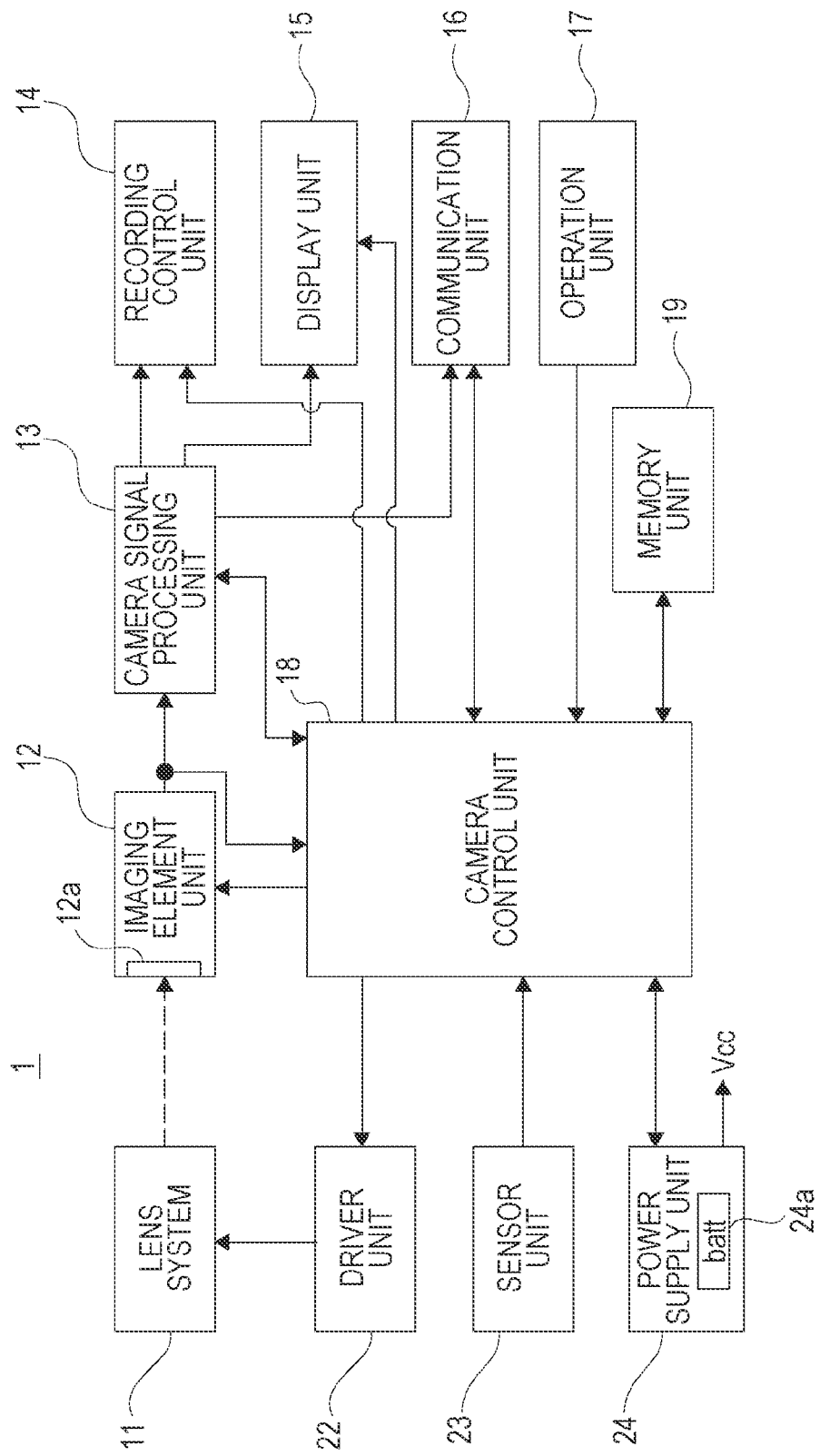
FIG. 2 is a block diagram of an imaging device according to the embodiment.

First, a configuration example of the imaging device 1 will be described with reference to FIG. 2.

The imaging device 1 includes, for example, a lens system 11, an imaging element unit 12, a camera signal processing unit 13, a recording control unit 14, a display unit 15, a communication unit 16, an operation unit 17, a camera control unit 18, a memory unit 19, a driver unit 22, a sensor unit 23, and a power supply unit 24.

The lens system 11 includes lenses such as a zoom lens and a focus lens, a diaphragm mechanism, and the like. Light (incident light) from a subject is guided by the lens system 11 and condensed on the imaging element unit 12.

The imaging element unit 12 includes, for example, an image sensor 12a (imaging element) of a complementary metal oxide semiconductor (CMOS) type, a charge coupled device (CCD) type, and the like.

The imaging element unit 12 performs, for example, correlated double sampling (CDS) processing, automatic gain control (AGC) processing, and the like, and further performs analog/digital (A/D) conversion processing on an electrical signal obtained by photoelectrically converting light received by the image sensor 12*a*. Then, an imaging signal as digital data is output to the camera signal processing unit 13 and the camera control unit 18 in a subsequent stage.

The camera signal processing unit 13 is configured as an image processing processor by, for example, a digital signal processor (DSP) and the like. The camera signal processing unit 13 performs various types of signal processing on the digital signal (captured image signal) from the imaging element unit 12. For example, as a camera process, the camera signal processing unit 13 performs preprocessing, synchronization processing, YC generation processing, resolution conversion processing, file formation processing, and the like.

In the preprocessing, clamp processing of clamping the black levels of R, G, and B to a predetermined level, correction processing between the color channels of R, G, and B, and the like are performed on the captured image signal from the imaging element unit 12.

In the synchronization processing, color separation processing is performed so that the image data for each pixel has all the R, G, and B color components. For example, in the case of an imaging element using a Bayer array color filter, demosaic processing is performed as the color separation processing.

In the YC generation processing, a luminance (Y) signal and a color (C) signal are generated (separated) from the R, G, and B image data.

In the resolution conversion processing, the resolution conversion processing is executed on the image data subjected to various types of signal processing.

In the file forming processing, for example, the image data subjected to the above-described various processing is subjected to, for example, compression encoding for recording or communication, formatting, generation or addition of metadata, and the like to generate a file for recording or communication.

For example, an image file in a format such as JPEG, tagged image file format (TIFF), or graphics interchange format (GIF) is generated as a still image file. Furthermore, it is also conceivable to generate an image file as an MP4 format and the like used for recording moving images and audio conforming to MPEG-4.

Note that it is also conceivable to generate an image file as raw (RAW) image data.

The camera signal processing unit 13 generates metadata including information of processing parameters in the camera signal processing unit 13, various control parameters acquired from the camera control unit 18, information indicating an operation situation of the lens system 11 or the imaging element unit 12, mode setting information, imaging environment information (date and time, place, and the like), identification information of the imaging device itself, information of a mounting lens, information of a previously registered camera operator (name and identification information), international press telecommunications council (IPTC) metadata, and the like.

Note that the IPTC metadata is metadata in a format designed by a media company association, and can describe various types of information such as "description/caption", "description writer", "headline", and "keyword".

The recording control unit 14 performs recording and reproduction on a recording medium by a nonvolatile memory, for example. The recording control unit 14 performs processing of recording an image such as moving image data or still image data or metadata on a recording medium, for example.

Various actual forms of the recording control unit 14 can be considered. For example, the recording control unit 14 may be configured as a flash memory built in the imaging device 1 and a write/read circuit thereof. Furthermore, the recording control unit 14 may be in the form of a card recording/reproducing unit that performs recording/reproducing access to a recording medium detachable from the imaging device 1, for example, a memory card (portable flash memory and the like). Furthermore, the recording control unit 14 may be realized as a hard disk drive (HDD) and the like as a form built in the imaging device 1.

The display unit 15 is a display unit that performs various displays for the imaging person, and is, for example, a display panel or a viewfinder by a display device such as a liquid crystal display (LCD) or an organic electro-luminescence (EL) display arranged in a housing of the imaging device 1.

The display unit 15 executes various displays on the display screen on the basis of an instruction from the camera control unit 18.

For example, the display unit 15 displays a reproduced image of the image data read from the recording medium in the recording control unit 14.

Furthermore, there is a case where image data of a captured image whose resolution has been converted for display by the camera signal processing unit 13 is supplied to the display unit 15, and the display unit 15 performs display on the basis of the image data of the captured image in response to an instruction from the camera control unit 18. As a result, a so-called through image (object monitoring image), which is a captured image during composition confirmation or moving image recording, is displayed.

Furthermore, the display unit 15 executes various operation menus, icons, messages, and the like, that is, display as a graphical user interface (GUI) on the screen on the basis of an instruction from the camera control unit 18.

The communication unit 16 performs data communication and network communication with an external device in a wired or wireless manner.

For example, captured image data (a still image file or a moving image file) and metadata are transmitted and output to an external information processing device, a display device, a recording device, a reproduction device, and the like.

Furthermore, the communication unit 16, as a network communication unit, can perform communication via the network 6 and transmit and receive various data to and from servers, terminals, and the like on the network. For example, in the case of the present embodiment, the communication unit 16 performs a communication process of transmitting captured image data, metadata, and the like to the server device 2.

Furthermore, the communication unit 16 may be capable of mutually performing information communication by short-range wireless communication such as Bluetooth (registered trademark), Wi-Fi (registered trademark) communication, or near field communication (NFC), or infrared communication, for example.

Furthermore, the communication unit 16 may include a wired connection unit, and the imaging device 1 and another device may be capable of performing data communication with each other by wired connection communication.

The operation unit 17 collectively indicates input devices for the user to perform various operation inputs. Specifically, the operation unit 17 indicates various operation elements (keys, dials, touch panels, touch pads, and the like) provided in the housing of the imaging device 1.

The operation of the user is detected by the operation unit 17, and a signal corresponding to the input operation is transmitted to the camera control unit 18.

The camera control unit 18 includes a microcomputer (arithmetic processing device) including a central processing unit (CPU).

The memory unit 19 stores information and the like used for processing by the camera control unit 18. As the illustrated memory unit 19, for example, a read only memory (ROM), a random access memory (RAM), a flash memory, and the like are comprehensively illustrated.

The memory unit 19 may be a memory area built in a microcomputer chip as the camera control unit 18 or may be configured by a separate memory chip.

The camera control unit 18 executes a program stored in the ROM, the flash memory, and the like of the memory unit 19 to control the entire imaging device 1.

For example, the camera control unit 18 controls operations of necessary units such as control of a shutter speed of the imaging element unit 12, an instruction of various signal processing in the camera signal processing unit 13, an imaging operation and a recording operation according to a user's operation, a reproduction operation of a recorded image file, an operation of the lens system 11 such as zooming, focusing, and diaphragm adjustment in a lens barrel, a user interface operation, and setting of a communication scheme and a transmission destination by the communication unit 16.

The RAM in the memory unit 19 is used for temporary storage of data, programs, and the like as a work area at the time of various data processing of the CPU of the camera control unit 18.

The ROM and the flash memory (nonvolatile memory) in the memory unit 19 are used for storing an operating system (OS) for the CPU to control each unit, content files such as image files, application programs for various operations, firmware, various types of setting information, and the like.

The various types of setting information include communication setting information, exposure setting as setting information regarding imaging operation, shutter speed setting, mode setting, white balance setting as setting information regarding image processing, color setting, setting regarding image effect, custom key setting and display setting as setting information regarding operability, and the like.

The driver unit 22 is provided with, for example, a motor driver for a zoom lens drive motor, a motor driver for a focus lens drive motor, a motor driver for a motor of a diaphragm mechanism, and the like.

These motor drivers apply a drive current to a corresponding driver according to an instruction from the camera control unit 18, and cause the driver to execute movement of the focus lens and the zoom lens, opening and closing of the diaphragm blade of the diaphragm mechanism, and the like.

The sensor unit 23 comprehensively indicates various sensors mounted on the imaging device.

For example, an inertial measurement unit (IMU) is mounted as the sensor unit 23. For example, an angular velocity (gyro) sensor of three axes of pitch, yaw, and roll can detect an angular velocity, and an acceleration sensor can detect an acceleration.

Furthermore, as the sensor unit 23, for example, a position information sensor, an illuminance sensor, and the like may be mounted.

Furthermore, it is assumed that a distance measuring sensor is provided as the sensor unit 23. A distance from the imaging device 1 to the subject can be measured by the distance measuring sensor at the time of imaging, and the distance information can be added as metadata to the captured image.

Various information detected by the sensor unit 23, for example, position information, distance information, illuminance information, IMU data, and the like are added as metadata to the captured image together with date and time information managed by the camera control unit 18.

The power supply unit 24 outputs a power supply voltage Vcc necessary for each unit using the battery 24a as a power supply. On/off of supply of the power supply voltage Vcc by the power supply unit 24, that is, on/off of the power supply of the imaging device 1 is controlled by the camera control unit 18. Furthermore, the camera control unit 18 can detect a capacity of the battery 24a, that is, a remaining battery capacity.

Note that the power supply unit 24 may be configured to be able to output the power supply voltage Vcc on the basis of an external power supply, for example, by connecting an AC adapter or receiving supply of a DC power supply voltage.

Figure 3:
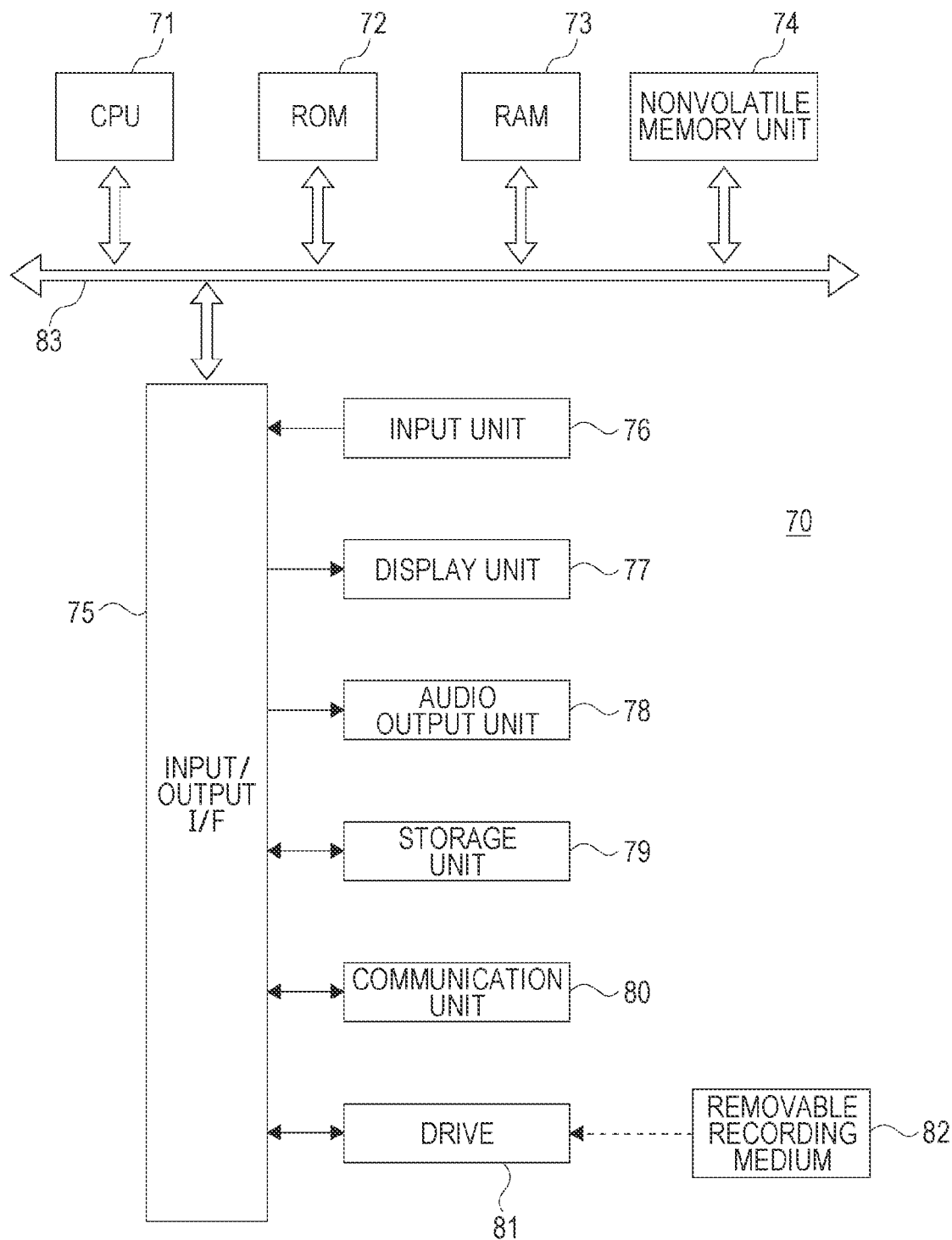
FIG. 3 is a block diagram of an information processing device according to the embodiment.

Next, a configuration example of an information processing device 70 applicable as the server device 2, the client terminal 3, and the MEC 5 is illustrated in FIG. 3.

A CPU 71 of the information processing device 70 executes various types of processing in accordance with a program stored in a nonvolatile memory unit 74 such as a ROM 72 or an electrically erasable programmable read-only memory (EEP-ROM), or a program loaded from a storage unit 79 to a RAM 73. The RAM 73 also appropriately stores data and the like necessary for the CPU 71 to execute various processing.

The CPU 71, the ROM 72, the RAM 73, and the nonvolatile memory unit 74 are connected to one another via a bus 83. An input/output interface 75 is also connected to the bus 83.

An input unit 76 including an operator and an operation device is connected to an input/output interface 75.

For example, as the input unit 76, various operators and operation devices such as a keyboard, a mouse, a key, a dial, a touch panel, a touch pad, and a remote controller are assumed.

An operation of the user is detected by the input unit 76, and a signal corresponding to the input operation is interpreted by the CPU 71.

Furthermore, a display unit 77 including an LCD, an organic EL panel, and the like, and an audio output unit 78 including a speaker and the like are connected to the input/output interface 75 integrally or separately.

The display unit 77 is a display unit that performs various displays, and includes, for example, a display device provided in a housing of the information processing device 70, a separate display device connected to the information processing device 70, and the like.

The display unit 77 executes display of an image for various types of image processing, a moving image to be processed, and the like on a display screen on the basis of an instruction from the CPU 71. Furthermore, the display unit 77 displays various operation menus, icons, messages, and the like, that is, displays as a graphical user interface (GUI) on the basis of an instruction from the CPU 71.

In some cases, the storage unit 79 including a hard disk, a solid-situation memory, and the like, and a communication unit 80 including a modem and the like are connected to the input/output interface 75.

The communication unit 80 performs communication processing via a transmission path such as the Internet, wired/wireless communication with various devices, bus communication, and the like.

A drive 81 is also connected to the input/output interface 75 as necessary, and a removable recording medium 82 such as a magnetic disk, an optical disk, a magneto-optical disk, or a semiconductor memory is appropriately mounted.

By the drive 81, a data file such as an image file, various computer programs, and the like can be read from the removable recording medium 82. The read data file is stored in the storage unit 79, and images and sounds included in the data file are output by the display unit 77 and the audio output unit 78. Furthermore, the computer program and the like read from the removable recording medium 82 are installed in the storage unit 79 as necessary.

In the information processing device 70, for example, software for the processing of the present embodiment can be installed via network communication by the communication unit 80 or the removable recording medium 82. Alternatively, the software may be stored in advance in the ROM 72, the storage unit 79, and the like.

For example, in a case where the information processing device 70 is the server device 2, software for processing for image providing service including situation determination processing and selection processing, or selection processing described below is installed. In that case, the CPU 71 functions as the control unit 2a in FIG. 1 and performs necessary processing. Various communications performed by the server device 2 are performed via the communication unit 80.

Furthermore, in a case where the information processing device 70 is the client terminal 3, interface processing using the input unit 76, the display unit 77, and the like is executed under the control of the CPU 71 in the course of processing to be described below. Various communications performed by the client terminal 3 are performed via the communication unit 80.

Furthermore, processing of the MEC 5 will be described in fifth and sixth embodiments, but the processing is processing performed by the CPU 71 in a case where the information processing device 70 is the MEC 5.

3. First and Second Embodiments

A first embodiment will be described with respect to operations of image transmission from the imaging device 1 to the server device 2 and image provision to the client terminal 3.

Figure 4:
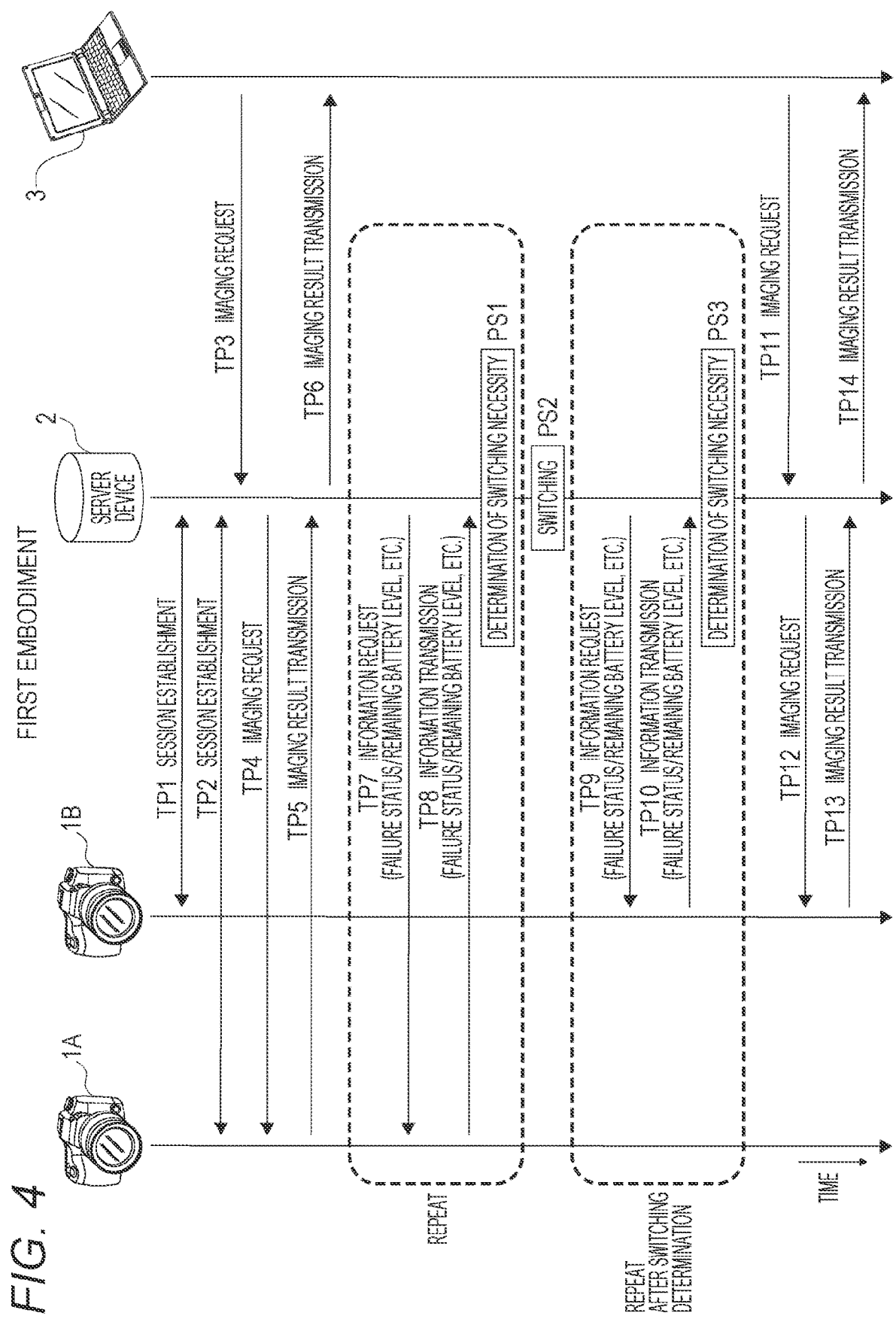
FIG. 4 is an explanatory diagram of communication and processing according to a first embodiment.

FIG. 4 illustrates an example of a procedure of communication and processing as the first embodiment.

Note that, in the description of each embodiment to be described below, as illustrated in FIG. 4, transmission and reception among the imaging device 1, the server device 2, and the client terminal 3 are indicated by an arrow with a symbol TP ("" is a numerical value), and processing of each device is indicated by a symbol PS**. The vertical direction (from top to bottom) in the figure corresponds to the progression of time.

Furthermore, the plurality of imaging devices 1 is distinguished by adding alphabets to numbers of reference numerals such as imaging devices 1A, 1B, . . . . Note that the figure illustrates that the number of imaging devices 1 is a plurality, and for convenience of simplification of illustration and description, two imaging devices 1A and 1B are illustrated in FIG. 4, for example. However, the number of the imaging devices 1 is not limited to two, and includes three or more imaging devices.

The first embodiment of FIG. 4 is an example in which the imaging device 1 that transmits an image is switched according to the situation determination. In the first embodiment, as one representative example, communication and processing of a procedure as illustrated in FIG. 4 may be performed.
Communication TP1

A communication session is established between the server device 2 and a certain imaging device 1B among the plurality of imaging devices.
Communication TP2

A communication session is established between the server device 2 and a certain imaging device 1A of the plurality of imaging devices.

While establishing a communication session with each imaging device 1 in this manner, the server device 2 selects any imaging device 1 as a device that performs imaging and captured image transmission.

The selection at this time point may be performed by an arbitrary operation, or may be performed according to a device situation of each imaging device 1 or whether or not a session can be established. The selection processing in this case is not limited.

For example, in the example of this drawing, it is assumed that the server device 2 initially selects the imaging device 1A as a device (transmission source of the captured image) to perform image transmission among the plurality of imaging devices 1 that has established a session.

Note that, although depending on a communication scheme to be adopted, regarding the communication session between the respective imaging devices 1, the server device 2 may disconnect the session for the imaging device 1 that is not selected as a transmission source of the captured image, or may maintain a period in which the imaging device 1 is not selected as the transmission source of the captured image. In a case where the session is to be disconnected, the session is only required to be stablished every time the session is to be selected as the transmission source of the captured image.
Communication TP3

An imaging request is transmitted from the client terminal 3 to the server device 2.

For example, in a case where the user of the client terminal 3 performs an operation of obtaining an image of the multi-camera system, for example, an operation of obtaining still image capturing, an imaging request is transmitted to the server device 2. Of course, the request may be a request for imaging/transmitting a moving image.

Furthermore, it is also conceivable that the client terminal 3 automatically transmits the imaging request periodically, at a specific time, and the like.
Communication TP4

In response to the imaging request, the server device 2 transmits the imaging request to a certain imaging device 1A being selected as a transmission source of the captured image.

Communication TP5

The imaging device 1A performs imaging in response to the imaging request, and transmits an image as an imaging result to the server device 2. Metadata may be transmitted in addition to the image.

Communication TP6

The server device 2 transfers the image as the imaging result transmitted from the imaging device 1A to the client terminal 3.

Therefore, the image according to the request can be viewed on the client terminal 3.

Since the communication TP5 is performed from the communication TP3 as needed, the client terminal 3 can request still image capturing to receive a still image or request moving image capturing to stream and view a moving image.

As described above, in a case where a certain imaging device 1A is selected as the transmission source of the captured image by the server device 2, and imaging and transmission are performed in the imaging device 1A in response to a request from the client terminal 3, the server device 2 repeatedly performs the situation determination for the imaging device 1A.

That is, communications TP7 and TP8, and processing PS1 indicated by broken lines are periodically repeated, for example.

Communication TP7

The server device 2 makes an information request to the imaging device 1A. For example, it is requested to transmit information such as a failure status and a remaining battery level.

Communication TP8

The imaging device 1A transmits information to the server device 2 in response to the information request.

Processing PS1

The server device 2 performs situation determination processing on the basis of the information received from the imaging device 1A, and determines the necessity of switching the imaging device 1 as the transmission source of the captured image.

If it is determined as a result of the situation determination that the imaging device 1A is in a situation suitable for imaging or image transmission as it is, the selected state of the imaging device 1A is maintained. That is, a state in which imaging and image transmission in response to the imaging request from the client terminal 3 are performed by the imaging device 1A is maintained.

On the other hand, when it is determined that the imaging device 1A is not suitable for imaging or image transmission as a result of the situation determination, switching processing from the imaging device 1A to another imaging device 1 (for example, the imaging device 1B) is performed.

Processing PS2

The server device 2 performs processing of switching the imaging device 1 selected as a device that performs imaging and image transmission from the imaging device 1A to, for example, the imaging device 1B.

After performing the switching in this manner, the server device 2 repeatedly performs the situation determination for the imaging device 1B.

That is, communications TP9 the TP10, and processing PS3 indicated by broken lines are periodically repeated, for example.

Communication TP9

The server device 2 makes an information request to the imaging device 1B. For example, it is requested to transmit information such as a failure status and a remaining battery level.

Communication TP10

The imaging device 1B transmits information to the server device 2 in response to the information request.

Processing PS3

The server device 2 performs the situation determination processing on the basis of the information received from the imaging device 1B, and determines the necessity of switching the imaging device 1.

That is, after the switching is performed, whether or not the imaging device 1B after the switching is in an appropriate situation as the imaging device 1 that performs imaging and image transmission is monitored immediately after the switching.

If it is in an inappropriate situation, switching processing to another imaging device 1 is further performed.

On the other hand, when the switched imaging device 1B is in an appropriate situation as the imaging device 1 that performs imaging and image transmission, the selected state of the imaging device 1B is maintained. In that case, for example, subsequent communication is performed as illustrated in the drawing.

Communication TP11

An imaging request is transmitted from the client terminal 3 to the server device 2.

Communication TP12

In response to the imaging request, the server device 2 transmits the imaging request to the selected imaging device 1B.

Communication TP13

The imaging device 1B performs imaging in response to the imaging request, and transmits an image as an imaging result to the server device 2. Metadata may be transmitted in addition to the image.

Communication TP14

The server device 2 transfers the image as the imaging result transmitted from the imaging device 1B to the client terminal 3. Therefore, the image according to the request can be viewed on the client terminal 3.

For example, in the case of a multi-camera system for the purpose of facility monitoring or traffic monitoring, the imaging device 1 suitable for monitoring can be selected by such an operation, and image transmission can be performed.

Note that the order and processing of the communication TPs described above are not necessarily the illustrated order. For example, the timing of generation of a request from the client terminal 3 is undefined. Therefore, before the communication TP6 from the communication TP3 are performed, the situation determination may be performed as the monitoring of the imaging device 1A in the communications TP7 and TP8, and the processing PS1.

Basically, as appearing in the above communication procedure, the server device 2 sequentially performs the situation determination processing on the imaging device 1 selected as the device (transmission source of the captured image) that captures and transmits the image, and performs the processing of switching the imaging device 1 to continue the selected state or set to the selected state as the selection processing according to the situation determination processing.

Various examples such as an operating status determination, an imaging conformity situation determination, an imaging environment situation determination, and a communication conformity situation determination can be considered for the type of information transmitted from the imaging device 1 for situation determination and situation determination processing corresponding thereto.

These details will be collectively described after the following description of a second embodiment.

Figure 5:
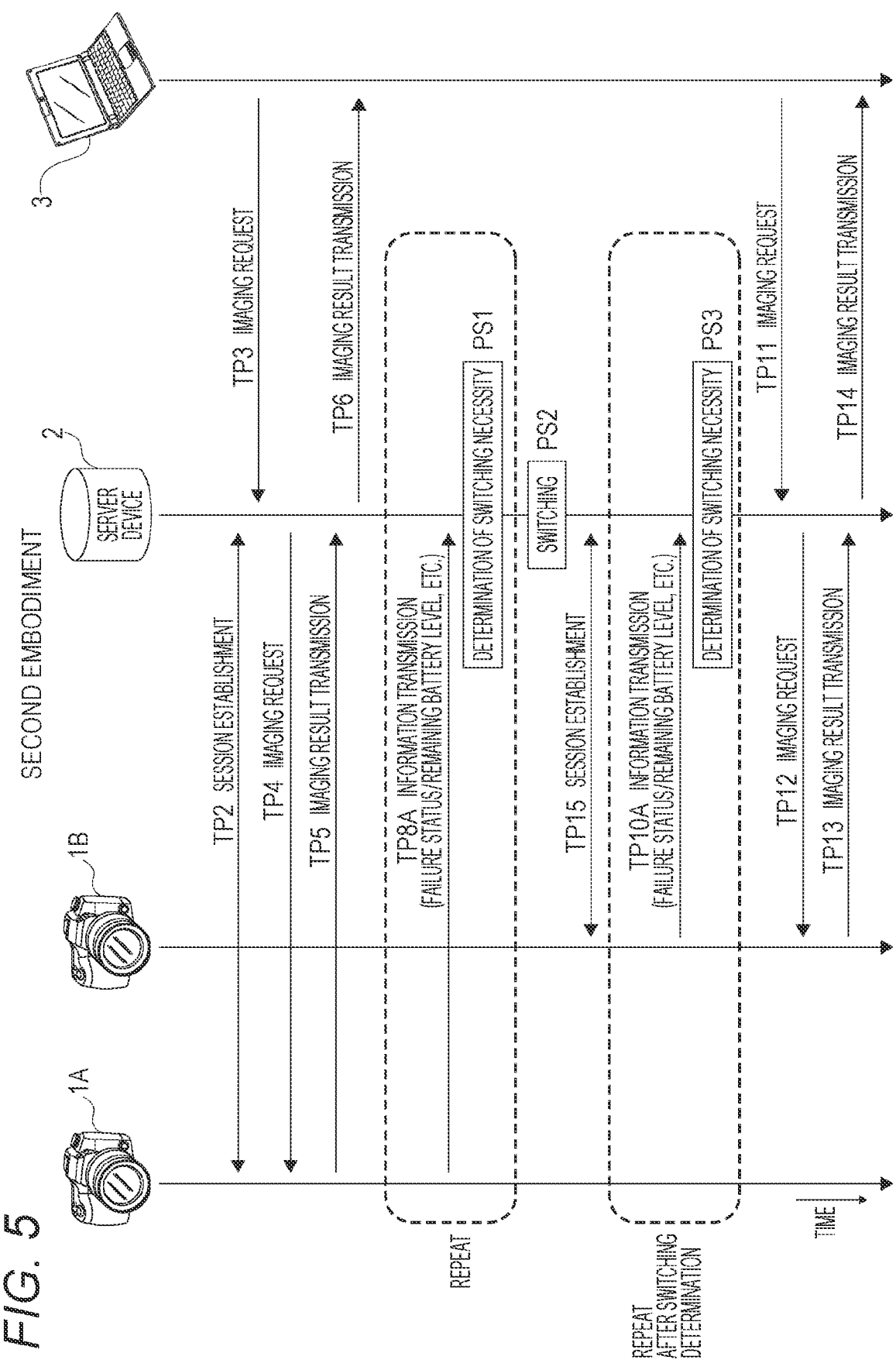
FIG. 5 is an explanatory diagram of communication and processing according to a second embodiment.

A procedure of communication and processing of the second embodiment is illustrated in FIG. 5. Note that, hereinafter, parts similar to those in the communication and the processing described above are denoted by the same signs, and overlapping of detailed description is avoided.

The second embodiment is an example in which the imaging device 1 transmits information for the situation determination to the server device 2 by push notification instead of the information request from the server device 2.

The example of FIG. 5 illustrates a state in which the server device 2 establishes a session with the imaging device 1A as communication TP2 and selects the device as a device (transmission source of the captured image) that performs captured image transmission. In this state, communication TP3, communication TP4, communication TP5, the communication TP6 are performed similarly to FIG. 4.

Then, communication TP8A and processing PS1 for monitoring indicated by a broken line are repeatedly performed.

In this case, as the communication TP8A, the imaging device 1A transmits, for example, information such as a failure status and a remaining battery level to the server device 2.

The server device 2 performs situation determination processing on the basis of the information received from the imaging device 1A, and determines the necessity of switching the imaging device 1.

In a case where the imaging device 1 that performs image transmission is switched, the server device 2 establishes a session with the imaging device 1B as communication TP15, for example.

Thereafter, as indicated by a broken line portion, it is monitored whether or not the imaging device 1B after switching is in an appropriate situation as a device that performs imaging and transmission of a captured image. In this case, the imaging device 1B as communication TP10A transmits information such as a failure state and a remaining battery level to the server device 2.

As processing PS3, the server device 2 performs the situation determination processing on the basis of the information received from the imaging device 1B, and determines the necessity of switching the imaging device 1.

As described above, also in the second embodiment, the server device 2 performs the situation determination processing on the imaging device 1 selected as the device that captures and transmits the image, and performs the processing of continuing the selected state or switching the device that captures and transmits the image as the selection processing corresponding thereto.

Figure 6:
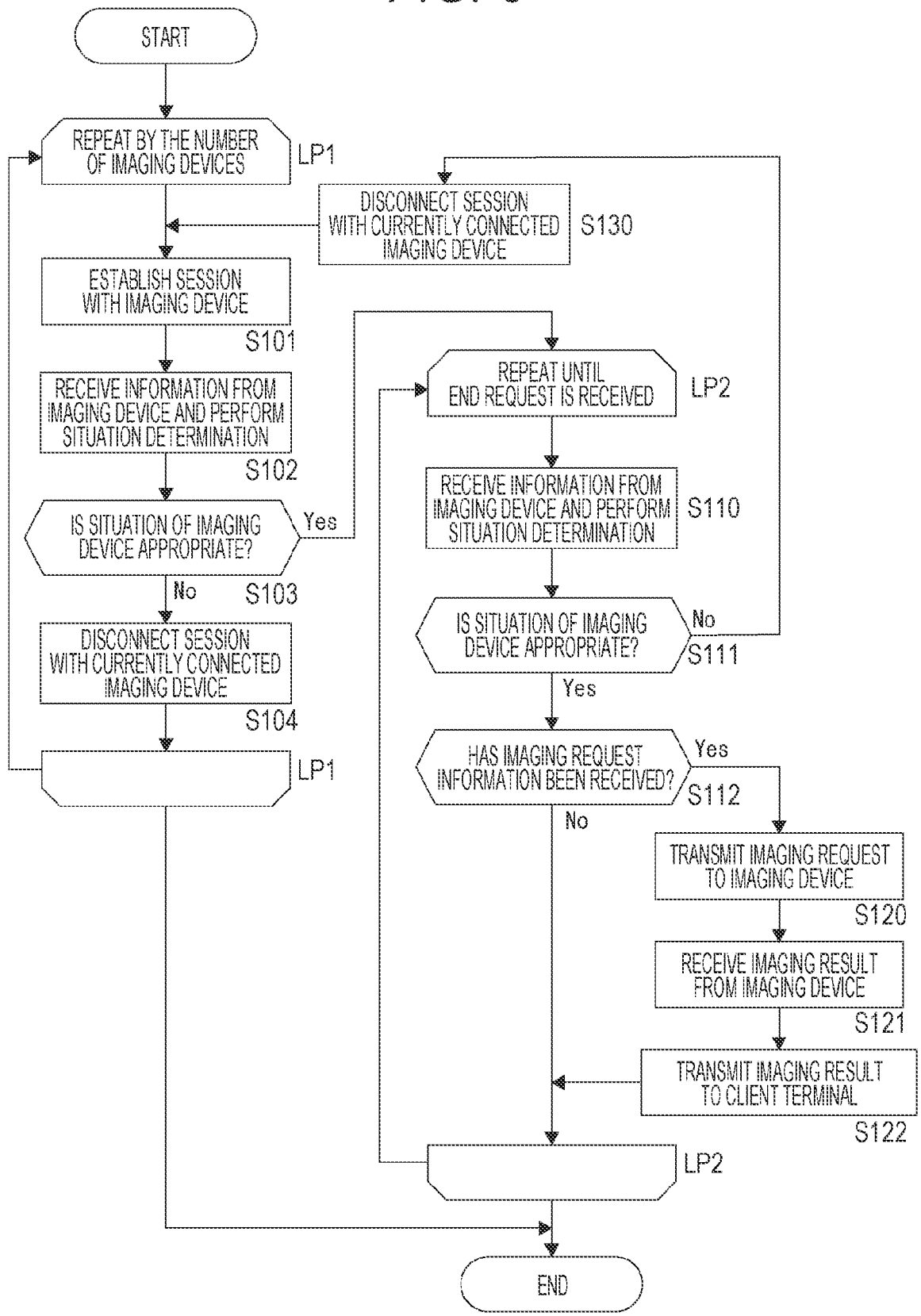
FIG. 6 is a flowchart of processing of a server device according to the first and second embodiments.

FIG. 6 illustrates a processing example of the server device 2 for an operation of such the first and second embodiments. FIG. 6 is a processing example executed by the control unit 2a (the CPU 71 in FIG. 3) of the server device 2.

As the loop processing LP1 of FIG. 6, the control unit 2a repeatedly performs the processes of steps S101 to S104 on each imaging device 1.

In step S101, the control unit 2a performs processing of establishing a communication session with a certain imaging device 1.

In step S102, the control unit 2a receives necessary information from the imaging device 1 connected for communication, and performs the situation determination.

This is, in the first embodiment, processing in which the control unit 2a makes an information request to a certain imaging device 1, receives transmission information from the imaging device according to the information request, and determines the situation of the imaging device 1.

Furthermore, in the second embodiment, the control unit 2a performs processing of determining the situation of a certain imaging device 1 in response to reception of information as a push notification from the imaging device 1.

In step S103, the control unit 2a branches the processing according to the situation determination result.

If the currently connected imaging device 1 is not suitable as a transmission source of the captured image, the control unit 2a proceeds to step S104, disconnects the session with the imaging device 1, and performs the processing from step S101 with another imaging device 1.

If it is determined that the currently connected imaging device 1 is in a state suitable for image capturing and image transmission, the control unit 2a proceeds from step S103 to the loop processing LP2.

In the loop processing LP2, the control unit 2a repeats the processing from step S110 to step S122 until an end request is received.

This is processing corresponding to a request from the client terminal 3 while selecting the imaging device 1 being connected for communication as the device of the transmission source of the captured image and performing the monitoring processing on the selected imaging device 1.

In step S110, the control unit 2a receives necessary information from the imaging device 1 being connected for communication, and performs the situation determination. Also in the first embodiment, the control unit 2a performs processing of making an information request to a certain imaging device 1, receiving transmission information from the imaging device according to the information request, and determining the situation of the imaging device 1.

Furthermore, in the second embodiment, the control unit 2a performs processing of determining the situation of a certain imaging device 1 in response to reception of information as a push notification from the imaging device 1.

In step S111, the control unit 2a branches the processing according to the situation determination result.

When it is determined that the imaging device 1 currently selected as the transmission source of the captured image is in a state suitable for image capturing and image transmission, the control unit 2a proceeds from step S111 to step S112 and determines whether or not an imaging request from the client terminal 3 has been received.

If not, the control unit 2a repeats the processing from step S110.

In a case where the imaging request from the client terminal 3 is received, the control unit 2a proceeds from step S112 to step S120, and transmits the imaging request to the currently selected imaging device 1.

Then, the control unit 2a performs processing of receiving the imaging result from the imaging device 1 in step S121, and performs processing of transmitting the imaging result to the client terminal 3 in step 3122.

Therefore, when a captured image is obtained from the client terminal 3, the server device 2 can provide the client terminal 3 with an image transmitted from the imaging device 1 being selected as a transmission source of the captured image.

Furthermore, in a case where it is determined in step S111 that the currently selected imaging device 1 is not in a situation suitable as a transmission source of the captured image, the control unit 2a proceeds to step S130, disconnects the session with the imaging device 1, and returns to the loop processing LP1. Then, the above-described processing is performed. The loop processing LP1 in this case is processing of switching the imaging device 1 as a transmission source of the captured image. In a case where an appropriate imaging device 1 can be selected, the processing proceeds from step 3103 to the loop processing LP2, the imaging device 1 is selected as a transmission source of the captured image, and situation monitoring processing and processing of responding to the request from the client terminal 3 are performed.

Here, in steps S102 and S110, the situation determination processing of determining whether the target imaging device is appropriate as a transmission source of the captured image is performed, and a specific example thereof will be described.

As the situation determination processing, determination of an operating status, an imaging compatibility situation, an imaging environment situation, a communication compatibility situation, and the like can be considered.

First, determination of an operating status of the imaging device 1 will be described. The operating status is a status related to the operation of the imaging device 1, and specific examples of the operating status include a power supply situation, a recording medium situation, a failure status, and the like.

First, the determination of the power supply situation refers to, for example, determining the remaining amount of the battery of the imaging device 1, whether an external power supply is used or a built-in battery is used as a power supply, and the like.

For example, in a case where a built-in battery is used, there is a possibility that subsequent imaging or image transmission is hindered due to a decrease in remaining battery capacity.

Therefore, the control unit 2a acquires information such as the remaining battery level from the imaging device 1, and performs battery situation determination such as whether or not the remaining battery level is larger than or equal to a predetermined level. If the remaining amount is larger than or equal to a predetermined value, the situation is determined to be appropriate as the transmission source of the captured image. On the other hand, if it is determined to be insufficient, the situation is determined to be inappropriate as the transmission source of the captured image.

Note that, in addition to determining the suitability/unsuitability of one imaging device 1 as a target of the situation determination processing from the remaining battery level situation, processing may be performed in which the remaining battery level situations of all the imaging devices 1 are compared, and the imaging device 1 with the largest remaining battery level is set as the imaging device 1 to be selected next in the switching processing.

As an example of the operating status of the imaging device 1, determination of the recording medium situation is also conceivable.

In the imaging device 1, as an imaging operation, captured image data and metadata are recorded on a recording medium by the recording control unit 14. Then, there may be a case where an image and the like is read from the recording medium and transmitted from the communication unit 16. In that case, if the remaining capacity as the storable capacity of the recording medium decreases, an appropriate operation may not be able to be continued.

Therefore, the control unit 2a acquires information on the remaining capacity that can be recorded in the recording medium from the imaging device 1, and performs situation determination such as whether or not the remaining capacity is a predetermined remaining capacity or more. If the remaining capacity is larger than or equal to a predetermined value, the situation is determined to be appropriate as the transmission source of the captured image. On the other hand, if the remaining capacity is determined to be insufficient, the situation is determined to be inappropriate as the transmission source of the captured image.

Note that, in addition to determining whether or not one imaging device 1 targeted for the situation determination processing is appropriate from the remaining capacity situation of the recording medium, processing of comparing the remaining capacity situations of all the imaging devices 1 and selecting the imaging device 1 having the largest remaining capacity as the imaging device 1 to be selected next in the switching processing may be performed.

As an example of the operating status of the imaging device 1, determination of a failure status is also conceivable.

There is a case where an appropriate operation cannot be continued due to some trouble occurring in the imaging device 1.

Therefore, the control unit 2a acquires information indicating a normal operation and a failure status from the imaging device 1 and performs failure status determination. In a case of normal operation, it is determined as an appropriate situation as the transmission source of the captured image, and on the other hand, in a case where some trouble occurs, it is determined as an inappropriate situation as the transmission source of the captured image.

Next, as the situation determination, determination of the imaging environment situation, that is, whether or not the imaging device is in an appropriate imaging environment will be described.

As an example, there is determination of a light amount situation.

For example, the control unit 2a acquires information (for example, information of the sensing device 9 built in the imaging device 1 or arranged in the vicinity thereof.) of the light quantity sensor corresponding to a position of the imaging device 1, and determines the light quantity situation around the imaging device 1. In response to this, it is determined whether or not the imaging device 1 is in an environment suitable for imaging.

For example, it is assumed that the imaging device 1 with high sensitivity is suitable in the case of the light amount at night, and that the imaging device 1 with high resolution is suitable in the case of the light amount in the daytime.

Similar suitability determination can be performed according to the weather. For example, in the case of cloudy weather or rainy weather, the imaging device 1 with high sensitivity is suitable, and in the case of fine weather, the imaging device 1 with high resolution is suitable.

Moreover, depending on the arrangement of each imaging device 1, image quality may deteriorate due to the influence of wind and rain. Therefore, it is also possible to determine that the imaging device 1 arranged in a state hardly affected by wind and rain is in a suitable imaging environment situation depending on the weather.

Next, as the situation determination, the imaging compatibility situation, that is, the determination of whether or not the imaging device can capture a more appropriate image will be described.

As an example of determining the imaging compatibility situation, it is conceivable to determine a distance situation to the subject.

For example, when it is desired to acquire information for a far subject, the imaging device 1 with a telephoto lens is selected and information is transmitted.

When it is desired to acquire information for a close subject, the imaging device 1 with a standard lens is selected, and the information is transmitted.

That is, processing of determining whether or not the imaging device 1 is the optimum imaging device 1 according to the distance to the subject and selecting the imaging device 1 as the transmission source is performed.

As an example of determining the imaging compatibility situation, an example of determining the situation of an imaging direction or an imaging angle of view of the imaging device 1 is also conceivable. It is possible to determine whether or not a situation is suitable for imaging of a predetermined subject according to the imaging direction and the angle of view of the imaging device 1.

Next, an example of determining whether or not the imaging device is an imaging device that captures a communication compatibility situation, that is, an image suitable for the communication situation is considered.

For example, in a situation where a communication speed of the network 6 is reduced, it can be determined that the imaging device 1 that transmits a captured image with a smaller data amount is suitable among the imaging devices 1. Conversely, in a situation where a network environment in which communication is smooth can be used, the imaging device 1 that transmits a captured image having a large data amount, such as a high-resolution image, can be determined as a transmission source suitable for the situation.

In the processing of step S102 or step S110, any one of the above-described examples of each situation determination may be performed, or a plurality of determinations may be performed in combination. Of course, a situation determination other than those described above may be performed.

Furthermore, the above examples can also be applied in combination to the examples of third and subsequent embodiments described below.

4. Third and Fourth Embodiments

Third and fourth embodiments are examples in which a device to be caused to transmit a captured image is selected among the plurality of imaging devices 1 on the basis of the situation determination processing for the imaging device 1 and the designation information regarding imaging by scanning performed by the client terminal 3.

Figure 7:
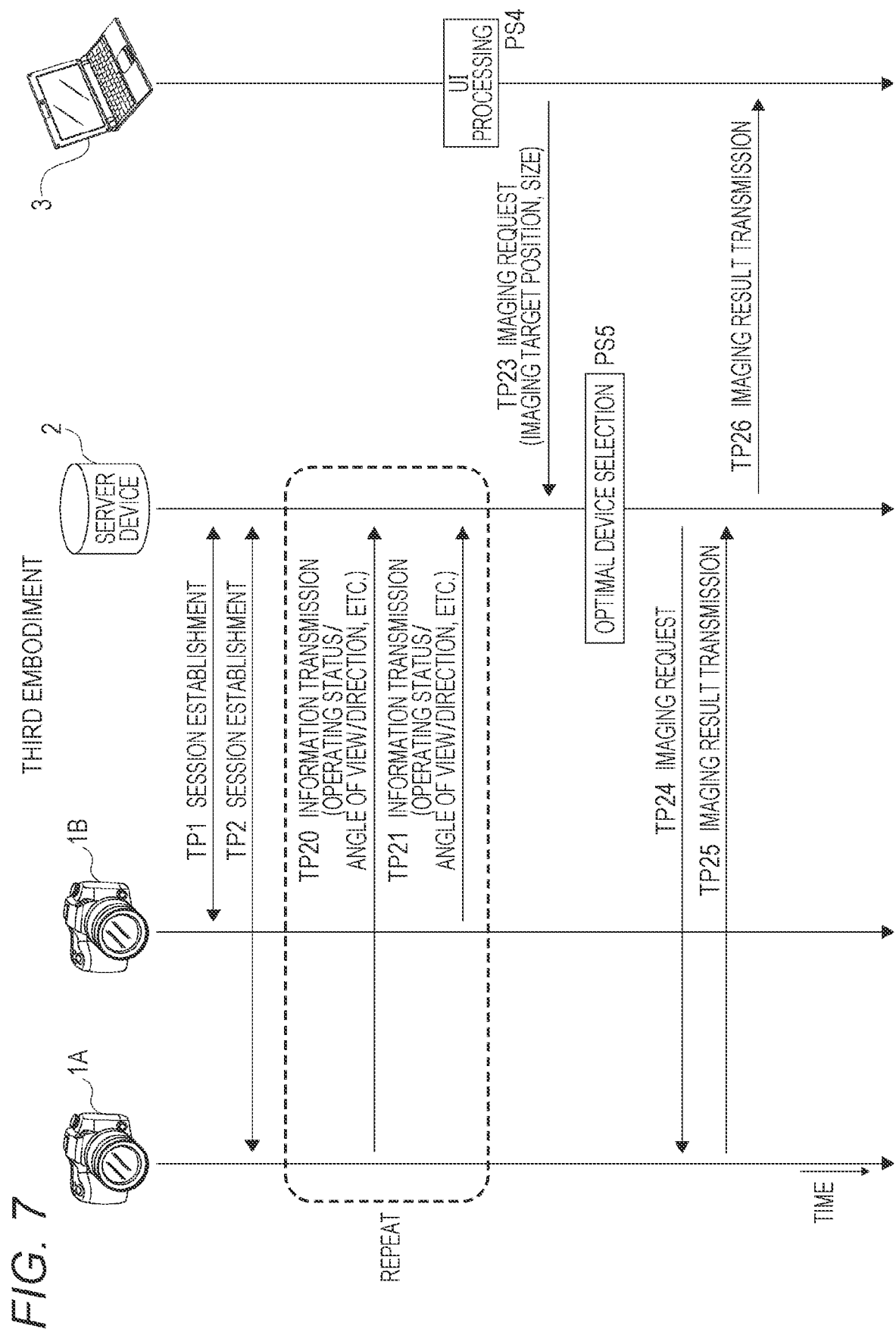
FIG. 7 is an explanatory diagram of communication and processing according to a third embodiment.

FIG. 7 illustrates an example of a procedure of communication and processing as the third embodiment.
Communication TP1

A communication session is established between the server device 2 and a certain imaging device 1B among the plurality of imaging devices.
Communication TP2

A communication session is established between the server device 2 and a certain imaging device 1A of the plurality of imaging devices.

In this manner, the server device 2 establishes a communication session with each of the plurality of imaging devices 1. Although only two imaging devices 1A and 1B are illustrated in the drawing, for example, if there are five imaging devices 1, communication sessions are established with the five imaging devices 1.
Communication TP20

The imaging device 1A transmits information such as an operating status, an angle of view, and a direction (imaging direction) to the server device 2.
Communication TP21

The imaging device 1B transmits information such as an operating status, an angle of view, and a direction (imaging direction) to the server device 2.

In this manner, each imaging device 1 transmits information indicating its own situation to the server device 2. In this case, the server device 2 may transmit the information request to each imaging device 1, and the received imaging device 1 may transmit the information in response thereto. For example, each imaging device 1 may transmit the information as a periodic push notification and the like.

In a case where there are three imaging devices 1 (not illustrated), these imaging devices 1 similarly transmit information to the server device 2.

Such information transmission from each imaging device 1 is sequentially and repeatedly executed. Therefore, the server device 2 can sequentially determine the situation of each imaging device 1.

Note that the situation determination includes an operating status, an imaging compatibility situation, an imaging environment situation, a communication compatibility situation, and the like as described above. The type of information to be transmitted by the imaging device 1 is only required to be determined according to what kind of situation determination is performed. The server device 2 may designate specific information and request the imaging device 1 to transmit the information.
Processing PS4

Information on a position and a size to be imaged (for example, a size of an imaging range, an angle of view according to the size, and the like) is designated and input by a user interface (UI) in the client terminal 3.
Communication TP23

An imaging request is transmitted from the client terminal 3 to the server device 2. In this case, position and size information is also transmitted as the designation information set in the processing PS4 together with the imaging request.

An example of a UI screen and designation information in the client terminal 3 in this case will be described.

Figure 8:
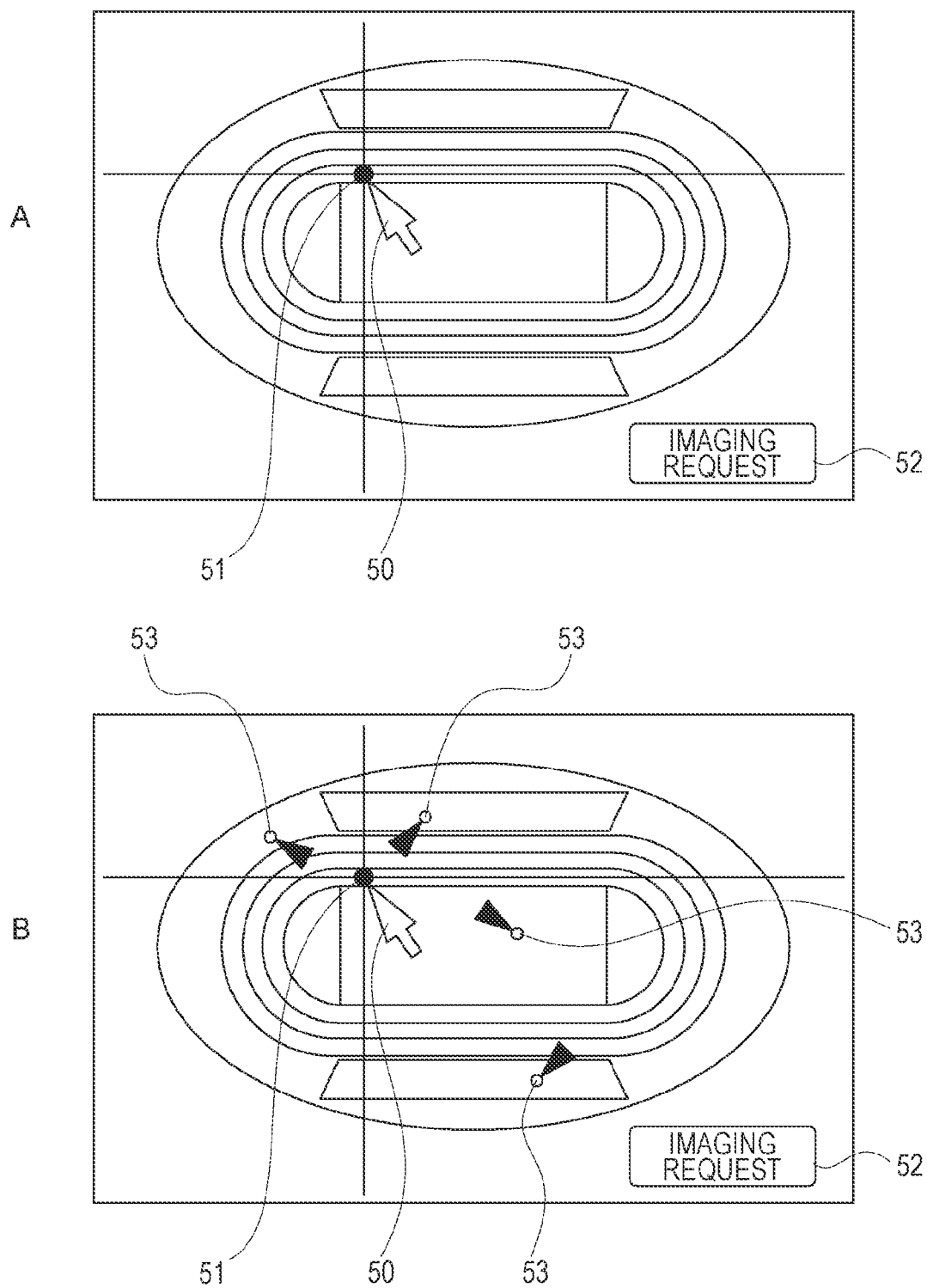
FIG. 8 is an explanatory diagram of user interfaces according to third and fourth embodiments.

FIG. 8A illustrates an example of a UI screen displayed on the client terminal 3. For example, transfer of a captured image in a stadium is considered. An image (or live image) of the stadium as an event venue is displayed on the screen, and the user can designate an arbitrary place by operating a cursor 50 and moving a pointer 51.

Then, an imaging request button 52 is operated in a state where the pointer 51 is positioned at a desired location. In response to this, the client terminal 3 executes the communication TP23. It is assumed that the imaging request at that time includes the position indicated by the pointer 51 as the designation information.

Of course, the above is an example, and for example, it is also conceivable to designate a range in which imaging is desired by designating a certain range.

Note that it is conceivable that the server device 2 provides such a UI screen to the client terminal 3. For example, the server device 2 enables the client terminal 3 to browse and operate the UI screen by a web page and the like.

FIG. 8B is an example in which a camera icon 53 is illustrated on the UI screen. For example, this is an example in which, in a case where four imaging devices 1 are arranged in an event venue, the positions and imaging directions of the imaging devices 1 are shown on the UI screen.

The server device 2 can provide the UI screen to which the camera icon 53 is added to the client terminal 3 by acquiring the arrangement position information and the information of the imaging direction (direction) from each imaging device 1 as described in the communications TP20 and TP21.

The camera icon 53 can also express the current angle of view of each imaging device 1 by, for example, an angle of a triangular portion.

Processing PS5

The server device 2 performs optimum device selection processing in response to the imaging request including the designation information.

In this case, the server device 2 performs the situation determination (determination of operating status, imaging conformity situation, imaging environment situation, communication conformity situation, and the like) of each imaging device 1 and the selection reflecting the position and the like indicated by the designation information.

For example, the server device 2 selects the imaging device 1 that can image the imaging position and is suitable for imaging and image transmission as a situation according to the designation information of the imaging position. In that sense, it is conceivable to perform the suitability/unsuitability determination based on the situation determination result of the imaging direction and the angle of view according to the designation information.

Communication TP24

The server device 2 transmits an imaging request to a certain imaging device 1A selected in the selection processing.

Communication TP25

The imaging device 1A performs imaging in response to the imaging request, and transmits an image and metadata as an imaging result to the server device 2.

Communication TP26

The server device 2 transfers the image as the imaging result transmitted from the imaging device 1A to the client terminal 3.

Therefore, the client terminal 3 can view an image obtained by capturing the position designated on the UI screen.

Figure 9:
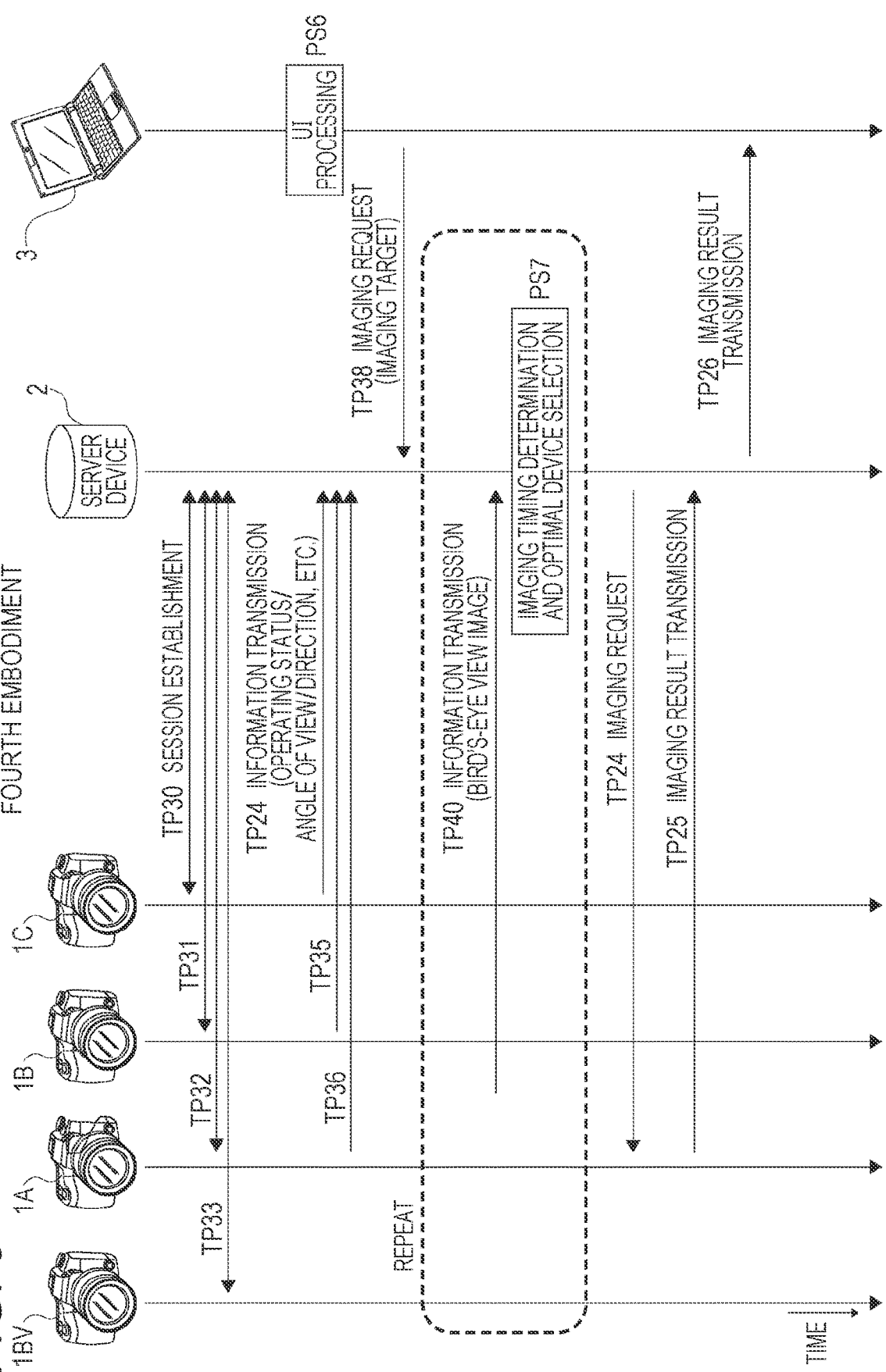
FIG. 9 is an explanatory diagram of communication and processing according to the fourth embodiment.

Next, a fourth embodiment will be described with reference to FIG. 9.

The fourth embodiment is an example in which the designation information on the UI screen is similarly reflected, but a bird's-eye view image is used.

In an event venue, a plurality of imaging devices 1A, 1B, 1C . . . is arranged, and one imaging device 1BV is arranged so as to capture a bird's-eye view image.

In this case, the imaging devices 1A, 1B, 1C, . . . are installed so as to be within an imaging angle of view of the imaging device 1BV.

As communication TP30, communication TP31, communication TP32, and communication TP33, the server device 2 establishes a communication session with each of the imaging devices 1A, 1B, and 1C and the imaging device 1BV.

Furthermore, as communication TP34, communication TP35, and communication TP36, each of the imaging devices 1A, 1B, and 1C transmits information such as an operating status, an angle of view, and a direction (imaging direction) to the server device 2.

Therefore, the server device 2 can determine the situation of each of the imaging devices 1A, 1B, and 1C.

In the processing PS6, for example, it is assumed that the client terminal 3 performs an operation of designating an imaging target on the UI screen as illustrated in FIGS. 8A and 8B or another screen. For example, a specific player, a person, a specific object, and the like can be designated.

Then, as communication TP38, the client terminal 3 transmits an imaging request including designation information of an imaging target to the server device 2.

In response to such an imaging request, communication TP40 and processing PS7 surrounded by a broken line are repeatedly performed.

As the communication TP40, the imaging device 1BV transmits a bird's-eye view image to the server device.

As the processing PS7, the server device 2 performs processing of selecting an appropriate imaging device 1 as an image transmission source on the basis of the bird's-eye view image, the designation information, and the situation determination of each imaging device 1.

In this case, the server device 2 determines the position of the imaging target (specific player and the like) from the bird's-eye view image. Furthermore, a timing at which the imaging target is captured by each imaging device 1 is determined. For example, in the case of track running, the optimum imaging device 1 is predicted and selected for each timing on the basis of the moving speed, course, and the like of the imaging target and the arrangement position of each imaging device 1.

Furthermore, selection is performed in consideration of the situation determination such as an operating status, an imaging compatibility situation, an imaging environment situation, and a communication compatibility situation of each imaging device 1.

Then, as the communication TP24, the server device 2 transmits an imaging request to a certain imaging device 1A selected in the selection processing.

The imaging device 1A performs imaging in response to the imaging request, and transmits an image and metadata as an imaging result to the server device 2 through the communication TP25.

The server device 2 transfers the image as the imaging result transmitted from the imaging device 1A to the TP26 client terminal 3.

Such the communication TP24, the communication TP25, and the communication TP26 are performed while the imaging device 1 selected in the processing PS7 is switched for each timing.

That is, the server device 2 transmits the imaging request to the optimal imaging device 1 selected in the processing PS7 at each time point.

Therefore, in the client terminal 3, for example, an image of a specific player specified on the UI screen can be viewed as an image captured by the appropriate imaging device 1 according to the position of the player at each time point.

By the way, in a case where the bird's eye image is obtained as described above, the bird's-eye view image may be browsed by the client terminal 3 and used for the UI screen.

Figure 10:
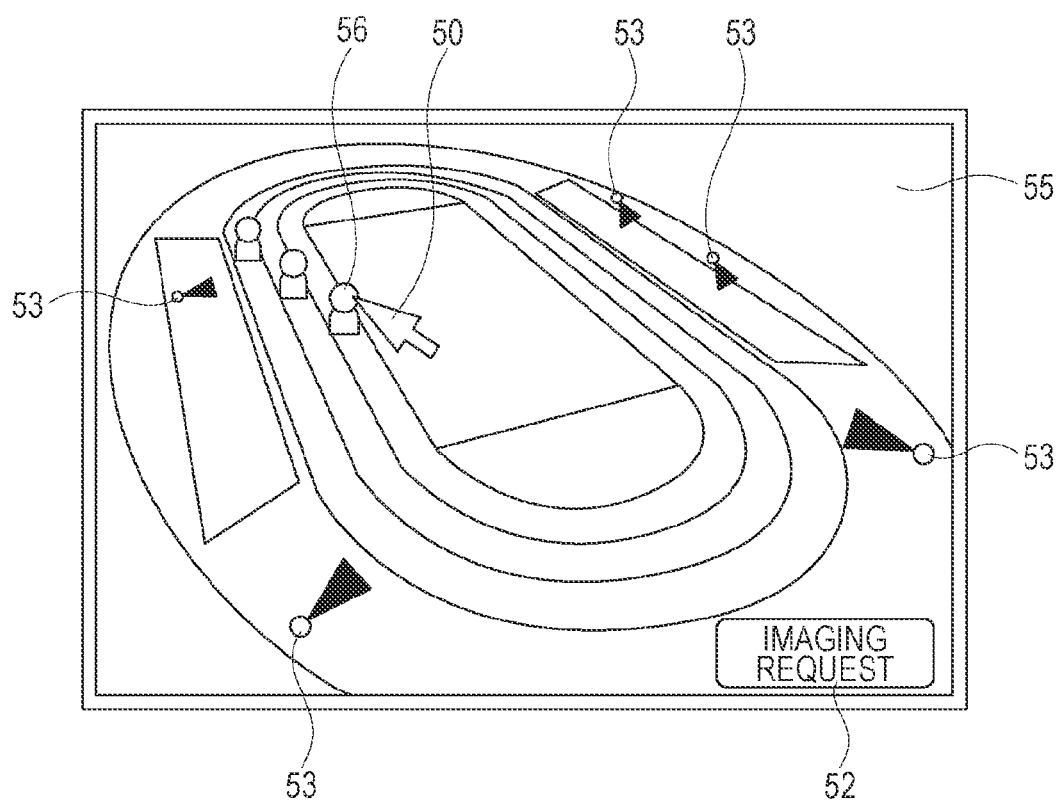
FIG. 10 is an explanatory diagram of another user interface according to the fourth embodiment.

For example, FIG. 10 illustrates an example in which a live image as a bird's-eye view image or a model image corresponding to the live image is used as a UI screen. The user of the client terminal 3 can operate the cursor 50 on the bird's-eye view image to designate, for example, a specific player 56 and the like. Therefore, it is expected that the user can more accurately recognize and operate the imaging target.

The camera icon 53 may be displayed on the bird's-eye view image.

Figure 11:
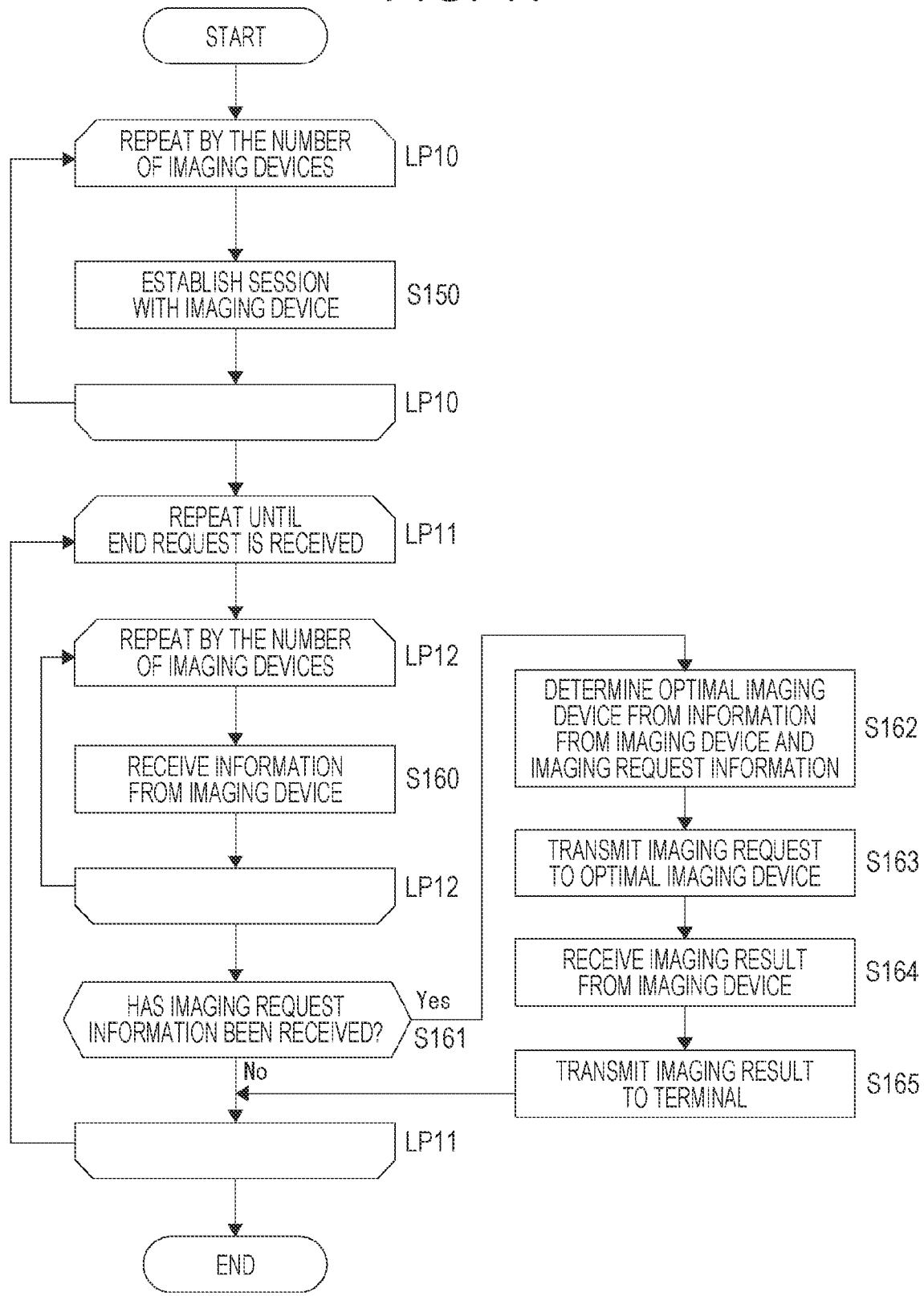
FIG. 11 is a flowchart of processing of the server device according to the third and fourth embodiments.

FIG. 11 illustrates a processing example of the server device 2 for an operation of the third and fourth embodiments described above. FIG. 11 is a processing example executed by the control unit 2a of the server device 2.

As loop processing LP10 of FIG. 11, the control unit 2a repeatedly performs processing of step S150 on each imaging device 1 (including the imaging device 1BV that captures a bird's-eye view image).

That is, in step S150, the control unit 2a performs processing of establishing a communication session with the imaging device 1.

Subsequently, the control unit 2a repeats loop processing LP11 until an end request is received.

First, as loop processing LP12, the control unit 2a repeatedly performs processing of step S160 on each imaging device 1. Although it is conceivable that the imaging device 1 in this case does not include the imaging device 1BV, the imaging device 1BV may also be included since there is a case where the imaging device 1BV can also be selected as one image transmission source.

In step S160, the control unit 2a performs processing of receiving transmission information from the imaging device 1. That is, the processing corresponds to the communication TP20 and the communication TP21 of FIG. 7 and the communication TP34, the communication TP35, and the communication TP36 of FIG. 8.

In step S161, the control unit 2a checks whether or not an imaging request has been received from the client terminal 3.

If not, the control unit 2a returns to the loop processing LP12.

In a case where the imaging request from the client terminal 3 has been received, the control unit 2a proceeds from step S161 to step S162, and performs processing of selecting an optimal imaging device 1 from the information from each imaging device 1 and the imaging request information including the designation information. That is, the processing described as the processing PS5 in FIG. 7 and the processing PS7 in FIG. 9 is performed.

Then, when the optimum imaging device 1 is selected, the control unit 2a transmits an imaging request to the selected imaging device 1 in step S163.

Then, the control unit 2a performs processing of receiving the imaging result from the imaging device 1 in step S164, and performs processing of transmitting the imaging result to the client terminal 3 in step S165.

Therefore, in a case where a captured image including the designation information is obtained from the client terminal 3, the server device 2 can select an appropriate imaging device 1 and provide an image transmitted from the imaging device 1 to the client terminal 3.

5. Fifth and Sixth Embodiments

Fifth and sixth embodiments are examples in which situation determination is performed as processing of the MEC 5. Note that an example of performing streaming transmission of a moving image will be described.

Figure 12:
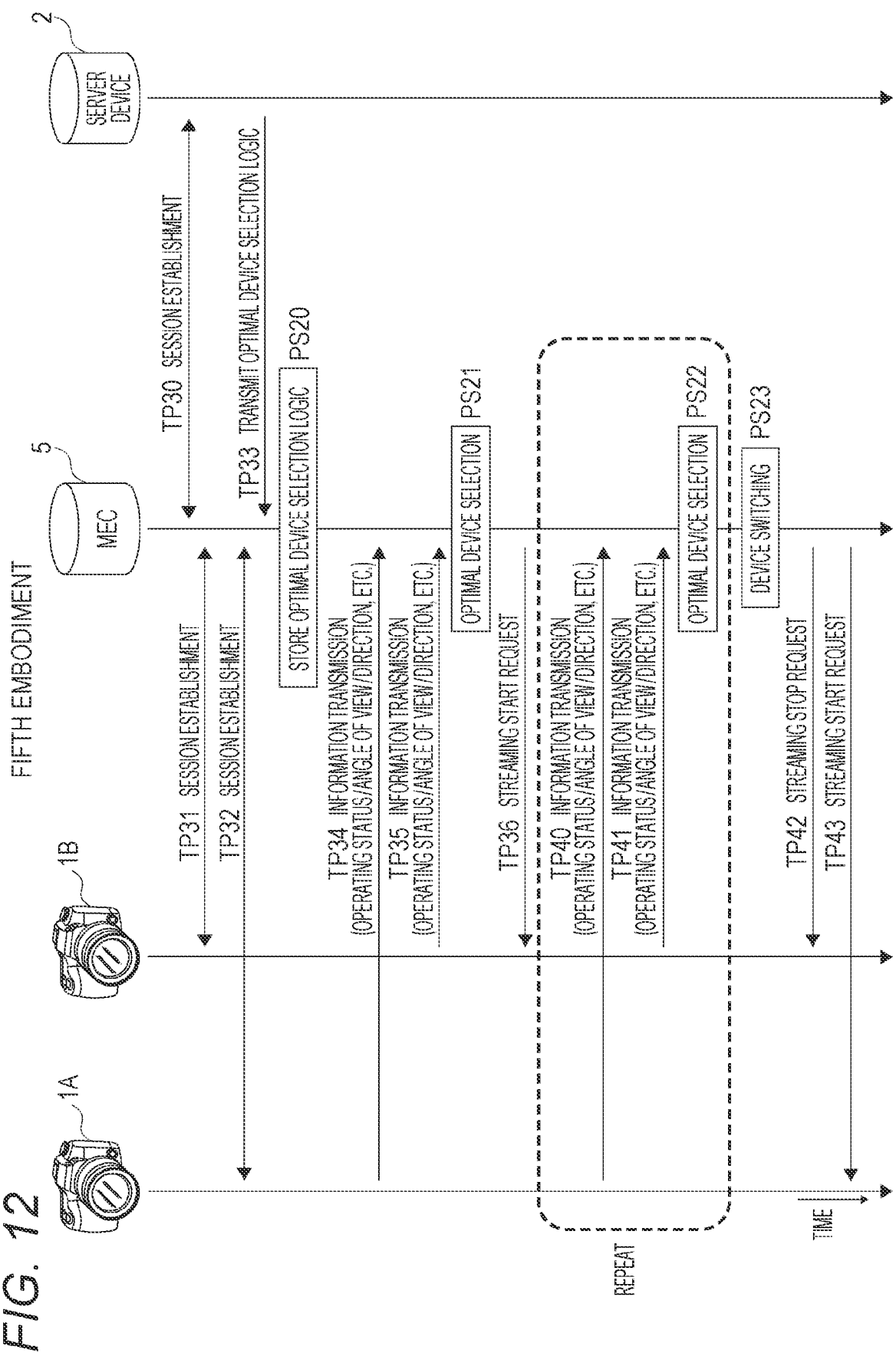
FIG. 12 is an explanatory diagram of communication and processing according to a fifth embodiment.

First, the fifth embodiment will be described with reference to FIG. 12. This is an example in which, as in the first and second embodiments, the MEC 5 performs processing of performing the situation determination on the imaging device 1 being selected and switching the image transmission source.

Communication TP30

A communication session is established between the server device 2 and the MEC 5.

Communication TP31, Communication TP32

A communication session is established between the MEC 5 and each of the imaging devices 1A and 1B.

Communication TP33

The server device 2 transmits optimal device selection logic to the MEC 5. The optimal device selection logic is logic indicating what kind of situation determination is performed and how to select the imaging device 1 suitable as the image transmission source on the basis of the determination result. That is, it is a logic of the situation determination and selection processing of the server device 2 according to the first and second embodiments.

Processing PS20

The MEC 5 stores the optimal device selection logic.

Communication TP34, Communication TP35

Each imaging device 1 transmits information such as an operation status, an angle of view, and an orientation (imaging direction) to the MEC 5.

In this case, the MEC 5 may transmit an information request to each imaging device 1, and the received imaging device 1 may perform information transmission accordingly. For example, each imaging device 1 may perform information transmission as periodic push notification and the like.

Processing PS21

The MEC 5 performs optimal device selection processing. That is, the situation determination of each imaging device 1 and the selection of the optimum imaging device 1 are performed using the optimum device selection logic.

As described above, the situation determination includes an operating status, an imaging compatibility situation, an imaging environment situation, a communication compatibility situation, and the like. According to these situation determinations, the imaging device 1 suitable for image transmission is selected.

Communication TP36

The MEC 5 transmits a streaming start request to a certain imaging device 1B selected by the optimal device selection logic.

Although not illustrated, streaming transmission is started in the imaging device 1B in response to this. The streaming image is transmitted to and stored in the server device 2 via the MEC 5, or transferred to the client terminal 3 and displayed and output.

Also during a period during which streaming transmission from a certain imaging device 1 is performed, the following operation indicated by a broken line part is repeated similarly to the communication TP34, the communication TP35, and the processing PS21 described above.

Communication TP40, Communication TP41

Each imaging device 1 transmits information such as an operation status, an angle of view, and an orientation (imaging direction) to the MEC 5.

Processing PS22

The MEC 5 performs optimal device selection processing.

Therefore, during streaming transmission from a certain imaging device 1B, a situation change of the certain imaging device 1B, a more appropriate situation of another imaging device 1, and the like is monitored. Then, the next processing PS23 and subsequent processing are performed as necessary.

Processing PS23

The MEC 5 determines that it is appropriate to switch the imaging device 1 as an image transmission source, and selects an appropriate imaging device 1.

Communication TP42

The MEC 5 transmits a streaming stop request to the imaging device 1B. Therefore, the imaging device 1B stops the streaming transmission.

Communication TP43

The MEC 5 transmits a streaming start request to the imaging device 1A determined to be in an appropriate situation. Therefore, the imaging device 1A starts streaming transmission.

In the above processing, the transmission source of the streaming transmission is switched according to the situation determination in the MEC 5.

For example, it is suitable in the case of a system such as a live camera, a weather camera, or a surveillance camera.

Furthermore, in the case of such an example, even if the network 6 between the MEC 5 and the server device 2 is disconnected, the optimal imaging device 1 can be determined on the basis of the logic deployed on the MEC.

Figure 13:
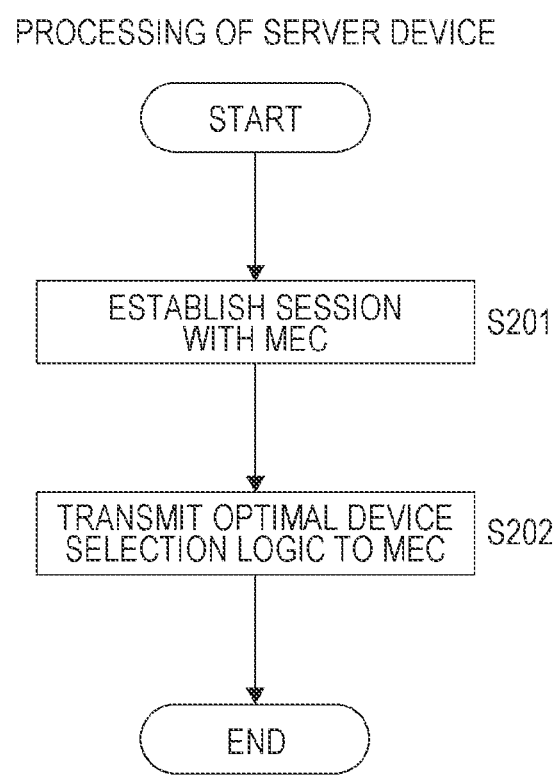
FIG. 13 is a flowchart of processing of a server device according to the fifth embodiment.
Figure 14:
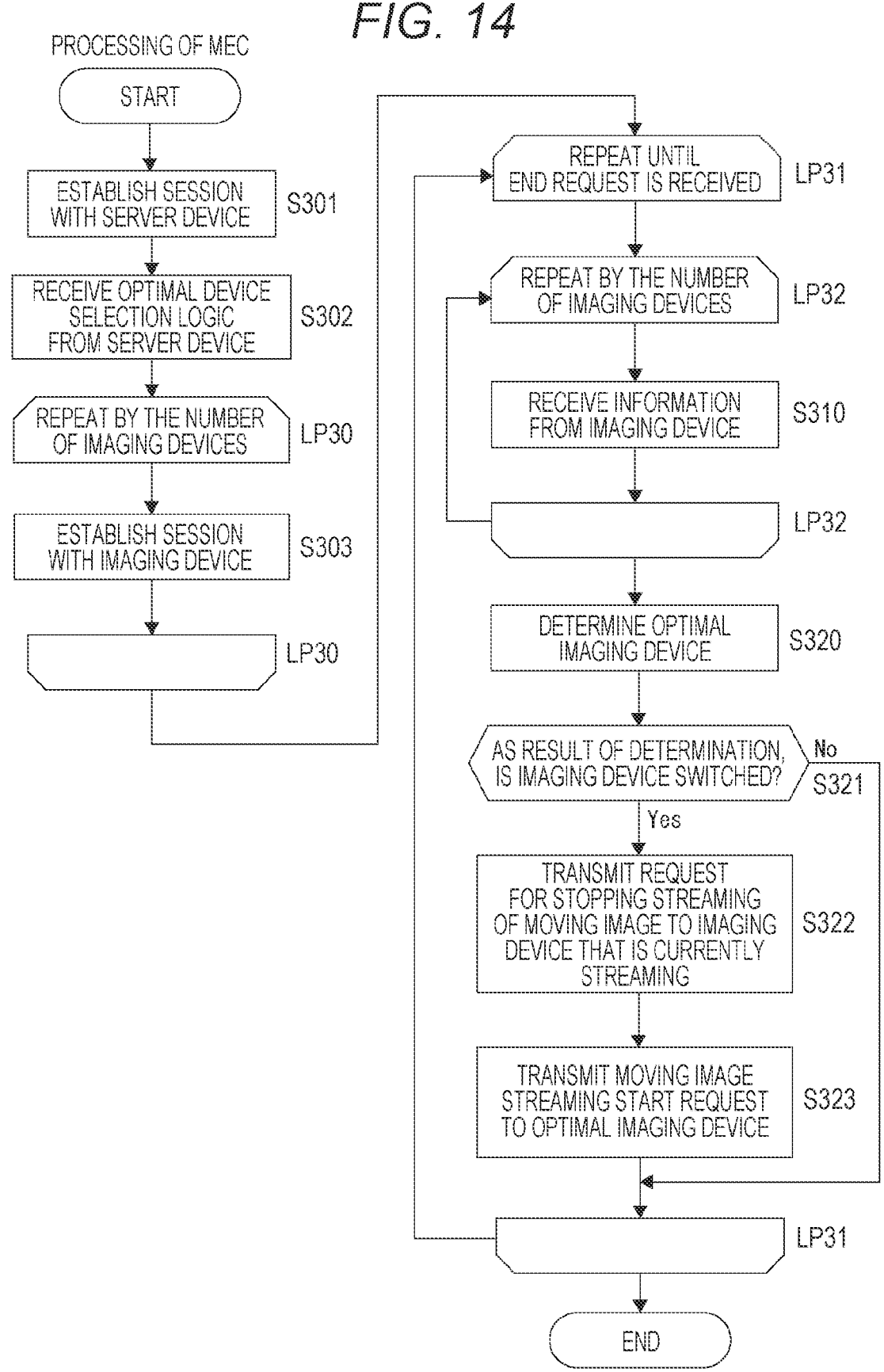
FIG. 14 is a flowchart of MEC processing according to the fifth embodiment.

An example of processing for such an operation is illustrated in FIGS. 13 and 14.

FIG. 13 illustrates processing of the server device 2.

The control unit 2a of the server device 2 performs processing of establishing a communication session with the MEC 5 in step S201. Then, in step S202, the control unit 2a transmits the optimal device selection logic to the MEC 5.

FIG. 14 shows processing of the MEC 5. The processing of the MEC 5 is processing of the CPU 71 in a case where the information processing device 70 in FIG. 3 is the MEC 5.

In step S301, the MEC 5 establishes a communication session with the server device 2.

In step S302, the MEC 5 receives the optimal device selection logic from the server device 2 and stores the optimal device selection logic.

The MEC 5 repeats step S303 as many times as the number of imaging devices 1 as loop processing LP30. In step S303, the MEC 5 establishes a communication session with the imaging device 1.

Subsequently, the MEC 5 repeats loop processing LP31 until a termination request is received.

First, the MEC 5 repeats step S310 as many times as the number of imaging devices 1 as loop processing LP32. In step S310, the MEC 5 performs processing of receiving the transmission information from the imaging device 1. That is, the processing corresponds to the communication TP34 and the communication TP35 of FIG. 12 and the communication TP40 and the communication TP41 of FIG. 8.

In step S320, the MEC 5 determines the optimal imaging device 1 using the optimal device selection logic.

In step S321, the MEC 5 branches the processing depending on whether or not the imaging device 1 as the image transmission source is switched depending on the determination result.

When the selected state is maintained, the processing directly returns to the loop processing LP32.

In a case where the imaging device 1 that is the image transmission source is switched, the MEC 5 proceeds from step S321 to step S322, and transmits a request for stopping streaming of a moving image to the imaging device 1 that is currently streaming.

Note that, in a case where streaming transmission has not been performed yet at this point of time, transmission of the streaming stop request may not be performed. That is, this is a case where the imaging device 1 is first selected at the start of streaming transmission in the processing PS21.

In step S323, the MEC 5 transmits a moving image streaming start request to the selected imaging device 1.

Then, the processing returns to the loop processing LP32.

As described above, the operation illustrated in FIG. 12 is executed.

Figure 15:
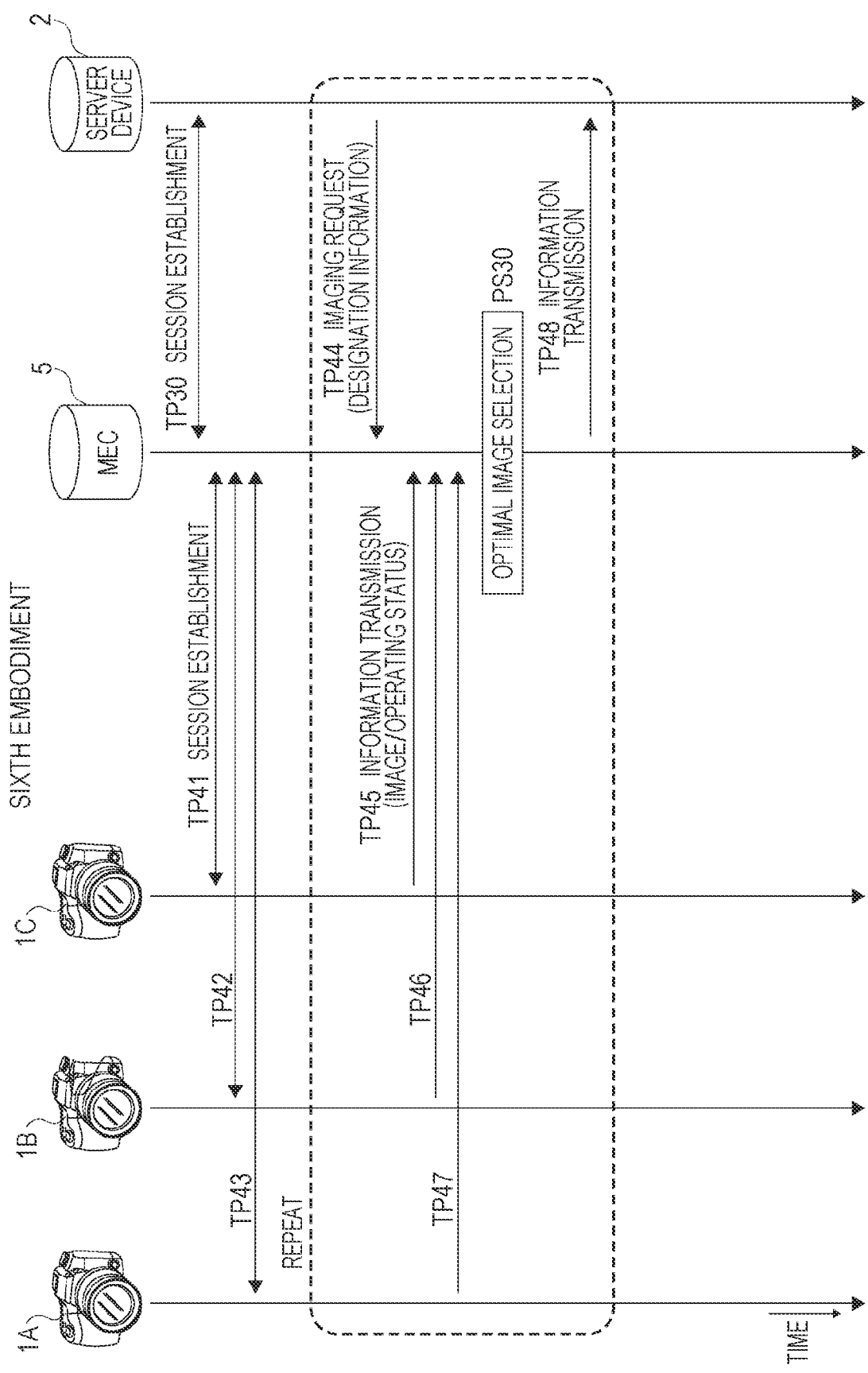
FIG. 15 is an explanatory diagram of communication and processing according to a sixth embodiment.

Next, a sixth embodiment will be described with reference to FIG. 15. This is an example in which the MEC 5 performs the selection in consideration of the situation determination and the designation information. As the designation information, it is conceivable that the designation information from the client terminal 3 is received from the server device 2 as in the third and fourth embodiments, but it is also conceivable that the server device 2 independently designates a specific imaging target.

Communication TP30

A communication session is established between the server device 2 and the MEC 5.

Communication TP41, Communication TP42, Communication TP43 a communication session is established between the MEC 5 and each of the imaging devices 1A, 1B, and 1C.

Thereafter, the following operation surrounded by a broken line is repeated.

Communication TP44

The server device 2 transmits an imaging request including the designation information such as an imaging target to the MEC 5, for example.

Communication TP45, Communication TP46, Communication TP47

Each imaging device 1 transmits information such as an image and an operating status to the MEC 5.

Processing PS30

The MEC 5 performs optimal image selection processing.

In this case, an optimum image suitable for the designation information is selected from among the images transmitted from each imaging device 1. It is conceivable that an image of a device unsuitable for imaging is not selected as a situation of the imaging device 1.

Communication TP48

The MEC 5 transmits the information selected in the optimal image selection processing to the server device 2.

As described above, an operation of collecting information from the imaging device 1 on the MEC 5 and determining information to be passed to the server device 2 is executed. The MEC 5 has a role of controlling the imaging device 1.

Figure 16:
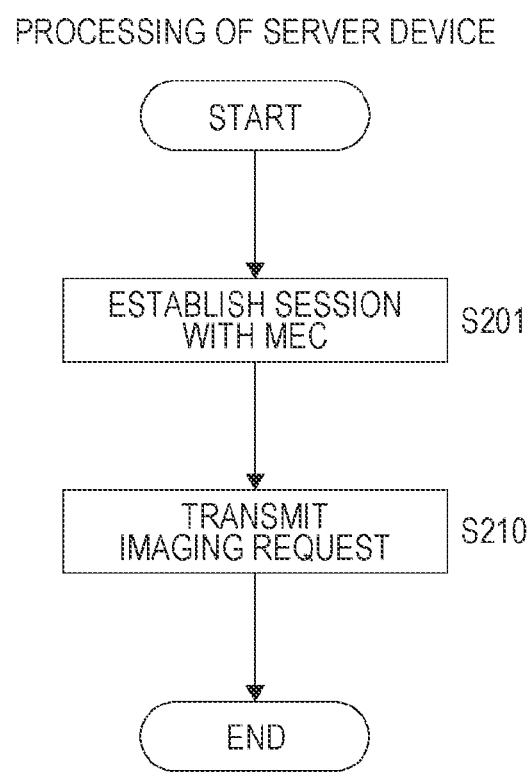
FIG. 16 is a flowchart of processing of a server device according to the sixth embodiment.
Figure 17:
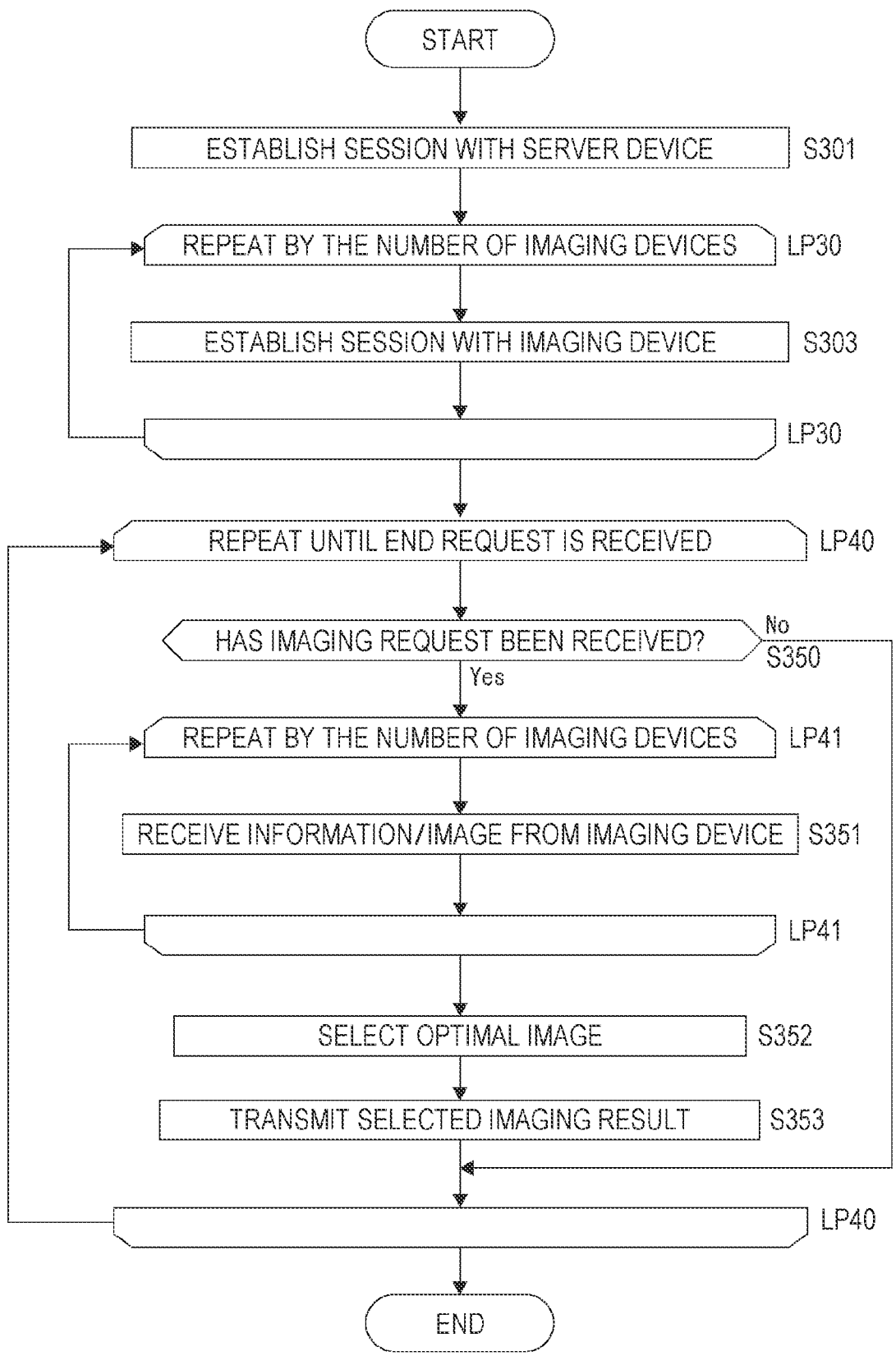
FIG. 17 is a flowchart of MEC processing according to the sixth embodiment.

An example of processing for such an operation is illustrated in FIGS. 16 and 17.

FIG. 16 illustrates processing of the server device 2.

The control unit 2a of the server device 2 performs processing of establishing a communication session with the MEC 5 in step S201.

The control unit 2a transmits the imaging request including the designation information to the MEC 5 in step S210 at timing as necessary.

FIG. 17 shows processing of the MEC 5.

In step S301, the MEC 5 establishes a communication session with the server device 2.

Furthermore, the MEC 5 repeats step S303 as many times as the number of imaging devices 1 as the loop processing LP30. In step S303, the MEC 5 establishes a communication session with the imaging device 1.

Subsequently, the MEC 5 repeats the loop processing LP40 until a termination request is received.

First, the MEC 5 checks whether or not an imaging request has been received from the server device 2 in step S350. If not, the following processing is not performed, and the confirmation of step S350 is continued.

In a case where the imaging request is received, the MEC 5 repeats step S351 as many times as the number of imaging devices 1 as the loop processing LP41. In step S351, the MEC 5 performs processing of receiving the captured image and various types of information from the imaging device 1. That is, the processing corresponds to the communication TP45, the communication TP46, and the communication TP47 of FIG. 15.

In step S352, the MEC 5 performs optimal image selection.

In step S353, the MEC 5 transmits the selected imaging result to the server device 2.

As described above, the operation illustrated in FIG. 15 is executed.

In the case of the sixth embodiment, an image is selected in consideration of the situation determination processing and the designation information, but as a result, an aspect of an example of selecting the imaging device 1 as a transmission source of an image to be transmitted to the server device 2 is provided.

6. Summary and Modification Examples

According to the above embodiment, the following effects can be obtained.

The server device 2 according to the embodiment includes the control unit 2a that performs the situation determination processing of determining whether or not a situation regarding an imaging operation in the imaging device 1 is a situation suitable for image transmission, and selection processing of selecting the imaging device 1 to be caused to transmit a captured image among the plurality of imaging devices 1 on the basis of the situation determination processing.

For example, as an example, it is assumed that a site where imaging is performed is a sports or other event venue, and imaging is performed by the plurality of imaging devices 1. By determining which imaging device 1 is appropriate for current imaging and transmitting an image, it is possible to capture or receive a comprehensively desirable image such as a selectively stable image or a good content image. Therefore, it is possible to realize quality improvement of image content by imaging by the plurality of imaging devices 1 as so-called multi-cameras, operation stability, and reliability improvement such as no image missing.

Note that, although one imaging device 1 is selected among the plurality of imaging devices 1 in the embodiment, the plurality of imaging devices 1 may be selected. For example, two imaging devices 1 may be selected from the five imaging devices 1 to execute image transmission. Alternatively, in some cases, it is also assumed that switching is performed so as to execute image transmission from all the imaging devices 1.

The server device 2 according to the first, second, and fifth embodiments performs the situation determination processing on an imaging device being selected as a device that performs captured image transmission, and performs the selection processing so that the imaging device 1 that performs image transmission can be switched to another imaging device 1 among the plurality of imaging devices 1 in a case where it is determined that the imaging device 1 is not in a situation suitable for image transmission.

Therefore, for example, in a situation where a certain imaging device 1 is selected as a device to transmit a captured image, for example, arbitrarily or by selection processing, it is possible to cope with a case where the imaging device 1 is no longer in an appropriate situation regarding imaging, and to perform switching. This contributes to improvement of image quality and stability of image transmission operation.

In the first embodiment, the server device 2 makes an information request to the imaging device 1, and performs the situation determination processing on the basis of the information transmitted from the imaging device 1 in response to the information request.

Therefore, the situation determination processing can be performed on the imaging device that needs to perform the determination processing, and the processing is made efficient.

In particular, the situation determination processing is not always performed for all the imaging devices 1, but for example, only the necessary situation determination is executed by repeatedly requesting information to the imaging device currently transmitting an image and performing the situation determination processing, and there are effects such as improvement of system operation efficiency and reduction of a traffic load due to reduction of useless communication.

In the second embodiment, the server device 2 performs the situation determination processing on the basis of notification information from the imaging device 1 being selected as a device that transmits a captured image.

That is, the side of the imaging device transmits the notification information to the information processing apparatus as necessary or as periodic timing. The information processing apparatus performs the situation determination processing for the imaging device that is transmitting an image according to the notification information.

Therefore, it is sufficient to monitor information transmitted as a push notification and the like from the imaging device 1 selected as a device that performs image transmission, and there is a possibility that the processing load on the side of the server device 2 can be reduced. In particular, if the imaging device 1 transmits a push notification when there is a change or fluctuation in the situation, the side of the server device 2 can cope with the situation by performing the situation determination processing when necessary without performing constant monitoring.

In the third and fourth embodiments, an example has been described in which the server device 2 performs the situation determination processing on two or more imaging devices 1 among the plurality of imaging devices 1, and in the selection processing, an imaging device to be caused to transmit a captured image is selected among the plurality of imaging devices 1 on the basis of the situation determination processing and the designation information related to imaging.

Therefore, it is possible to select the imaging device 1 that can be determined to be optimal by monitoring the situation of each imaging device 1 arranged as a multi-camera and execute image transmission.

In the third embodiment, the information on the position as the subject is taken as an example of the designation information.

Therefore, it is possible to select the imaging device 1 suitable for imaging at a specific position among the imaging devices 1 arranged as the multi-cameras and execute image transmission. For example, the image desired by a client side can be provided by designating the position on a side of the client terminal 3.

In the fourth embodiment, the information for designating the imaging target has been described as an example of the designation information.

Therefore, it is possible to select a specific person and the like as an imaging target among the imaging devices 1 arranged as the multi-cameras, select the imaging device 1 suitable for the imaging, and execute image transmission. For example, by designating an imaging target on the side of the client terminal 3, an image desired by the client side can be provided.

As the situation determination processing of the embodiment, an example of determining the power supply situation of the imaging device 1 has been described.

For example, a situation of a remaining amount of a battery of the imaging device, whether it is an external power supply/battery, and the like is determined.

Therefore, it is determined whether or not the imaging device 1 is in a power supply situation suitable for continuation of imaging/image transmission, and selection processing for switching the imaging device 1 as necessary becomes possible. Therefore, it is possible to continue stable image transmission of a still image or a moving image by switching from the imaging device 1 that is likely to be disabled due to the power supply situation to another imaging device 1.

As the situation determination processing of the embodiment, an example of determining the failure status of the imaging device 1 has been described.

Therefore, it is possible to monitor that the imaging device 1 is not suitable for continuation of imaging/image transmission due to a device failure, and it is possible to perform the selection processing of switching the imaging device 1 as necessary. Therefore, stable image transmission can be continued in the multi-camera system.

As the situation determination processing of the embodiment, an example of determining the situation of the recording medium of the imaging device 1 has been described. For example, a recordable capacity of the recording medium in the imaging device 1, a defect of the recording medium, and the like is determined.

Therefore, the imaging device 1 can appropriately continue the recording of the captured image, and can monitor whether or not the image can be stably transmitted.

As the situation determination processing of the embodiment, an example of determining the situation of the imaging environment of the imaging device 1 has been described. For example, an amount of light and weather at a place where the imaging device is disposed are determined.

Therefore, it is determined whether or not the imaging device 1 can appropriately capture an image. For example, in a stadium or an event venue, a lighting condition, an influence of weather, and the like vary depending on a place, and the imaging device 1 having a brightness state suitable for imaging at each time point may change. Such a change in brightness condition can also be handled. Furthermore, assuming a live camera and the like fixedly arranged at each place, the installation place and the imaging direction of the imaging device 1 fluctuate in a situation suitable/unsuitable for imaging due to the influence of rain or wind. The imaging device 1 suitable for such a situation can be selected.

As the situation determination processing of the embodiment, an example has been described in which the situation of the distance to the imaging target of the imaging device 1 is determined. For example, the situation of the distance from the place where the imaging device 1 is disposed to the specific subject is determined, and the appropriate imaging device 1 is selected. Alternatively, an appropriate imaging device 1 is selected from the relationship between the function of the imaging device 1 and the distance.

Therefore, the imaging device 1 having an appropriate distance relationship with the subject can be selected. Furthermore, it is also possible to select the imaging device 1 to which a telephoto lens is attached for a far subject, or select the imaging device 1 to which a standard lens is attached for a near subject.

As the situation determination processing of the embodiment, an example has been described in which the conformity situation between the captured image of the imaging device 1 and the communication speed is determined.

Therefore, it is possible to select the imaging device 1 that captures an image of an appropriate data size according to the current communication speed by the network 6. For example, in order to avoid transmission of a large amount of data in a situation where the communication speed is reduced, the imaging device 1 having a small data size of the captured image is selected.

As the situation determination processing of the embodiment, an example has been described in which the situation of the imaging direction or the imaging angle of view of the imaging device 1 is determined. It is possible to determine whether or not a situation is suitable for imaging of a predetermined subject according to the imaging direction or the angle of view of the imaging device.

Therefore, it is possible to select the imaging device 1 having an appropriate imaging direction and angle of view for the target subject, and to obtain a desirable image as an image of the target subject.

Note that, in the embodiment, the processing of the information processing device 70 as the server device 2 or the MEC 5 has been mainly described. However, specific examples of the information processing apparatus of the present disclosure are not limited to the information processing apparatus as the cloud server or the MEC, and various examples can be considered. Examples of the information processing device include a personal computer device, a tablet type information processing device, a mobile phone device, a game device, an audio device, a video device, a communication device, a television device, and various examples. An apparatus capable of performing calculation as information processing, for example, an apparatus incorporating a microcomputer can be implemented as the information processing apparatus of the present disclosure.

The program of the embodiment is a program for causing a CPU, a DSP, and the like, or a device including the CPU, the DSP, and the like, to execute the processing of the server device 2 or the MEC 5 described above.

That is, the program according to the embodiment is a program for causing an information processing apparatus to execute: situation determination processing of determining whether or not a situation regarding an imaging operation in the imaging device 1 is a situation suitable for image transmission; and selection processing of selecting the imaging device 1 to be caused to transmit a captured image among the plurality of imaging devices 1 on the basis of the situation determination processing.

With such a program, the server device 2 and the MEC 5 described above can be realized by various computer devices.

These programs can be recorded in advance in an HDD as a recording medium built in a device such as a computer device, a ROM in a microcomputer having a CPU, and the like.

Alternatively, the program can be temporarily or permanently stored (recorded) in a removable recording medium such as a flexible disk, a compact disc read only memory (CD-ROM), a magneto optical (MO) disk, a digital versatile disc (DVD), a Blu-ray disc (registered trademark), a magnetic disk, a semiconductor memory, or a memory card. Such a removable recording medium can be provided as so-called package software.

Furthermore, such a program can be installed from a removable recording medium to a personal computer and the like, or can be downloaded from a download site via a network such as a local area network (LAN) or the Internet.

Furthermore, such a program is suitable for providing the server device 2 and the MEC 5 of the embodiment in a wide range. For example, by downloading the program to a portable terminal device such as a smartphone or a tablet, a mobile phone, a personal computer, a game device, a video device, a personal digital assistant (PDA), and the like, the smartphone and the like can be caused to function as the server device 2 or the imaging device 1 of the present disclosure.

Note that the effects described in the present specification are merely examples and are not limited, and other effects may be provided.

Note that the present technology can also adopt the following configurations.

(1)
An information processing apparatus including
a control unit that performs:
situation determination processing of determining whether or not a situation related to an imaging operation in an imaging device is a situation suitable for image transmission; and
selection processing of selecting an imaging device to be caused to transmit a captured image among a plurality of imaging devices on the basis of the situation determination processing.

(2)
The information processing apparatus according to (1) described above, in which
the control unit
performs the situation determination processing on an imaging device being selected as a device that performs captured image transmission, and
performs, in a case where it is determined that the imaging device is not in a situation suitable for image transmission, the selection processing such that the imaging device that performs image transmission is switched to another imaging device among the plurality of imaging devices.

(3)
The information processing apparatus according to (1) or (2) described above, in which
the control unit makes an information request to the imaging device, and performs the situation determination processing on the basis of information transmitted from the imaging device in response to the information request.

(4)
The information processing apparatus according to (1) or (2) described above, in which
the control unit performs the situation determination processing on the basis of notification information from an imaging device being selected as a device that performs captured image transmission.

(5)
The information processing apparatus according to (1) described above, in which
the control unit
performs the situation determination processing on two or more imaging devices among the plurality of imaging devices, and
selects, in the selection processing, an imaging device to be caused to transmit a captured image from the plurality of imaging devices on the basis of the situation determination processing and designation information related to imaging.

(6)
The information processing apparatus according to (5) described above, in which
the designation information is information of a position as a subject.

(7)
The information processing apparatus according to (5) described above, in which
the designation information is information for designating an imaging target.

(8)
The information processing apparatus according to any one of (1) to (7) described above, in which
in the situation determination processing, a power supply situation of the imaging device is determined.

(9)
The information processing apparatus according to any one of (1) to (8) described above, in which
in the situation determination processing, a failure status of the imaging device is determined.

(10)
The information processing apparatus according to any one of (1) to (9) described above, in which
in the situation determination processing, a situation of a recording medium of the imaging device is determined.

(11)
The information processing apparatus according to any one of (1) to (10) described above, in which
in the situation determination processing, a situation of an imaging environment of the imaging device is determined.

(12)
The information processing apparatus according to any one of (1) to (11) described above, in which
in the situation determination processing, a situation of a distance to an imaging target of the imaging device is determined.

(13)
The information processing apparatus according to any one of (1) to (12) described above, in which
in the situation determination processing, a compatibility situation between a captured image of the imaging device and a communication speed is determined.

(14)
The information processing apparatus according to any one of (1) to (13) described above, in which
in the situation determination processing, a situation of an imaging direction or an imaging angle of view of the imaging device is determined.

(15)
An information processing method in which an information processing apparatus performs:

situation determination processing of determining
  whether or not a situation related to an imaging operation in an imaging device is a situation suitable for image transmission; and
selection processing of selecting an imaging device to be caused to transmit a captured image among a plurality of imaging devices on the basis of the situation determination processing.

(16)
A program that causes an information processing apparatus to execute:
situation determination processing of determining whether or not a situation related to an imaging operation in an imaging device is a situation suitable for image transmission; and
selection processing of selecting an imaging device to be caused to transmit a captured image among a plurality of imaging devices on the basis of the situation determination processing.

REFERENCE SIGNS LIST

1 Imaging device
2 Server device
2a Control unit
3 Client terminal
4 Base station
5 MEC
6 Network
70 Information processing device
71 CPU

The invention claimed is:

1. An information processing apparatus comprising
a controller configured to:
perform situation determination processing of determining whether a situation related to an imaging operation in an imaging device is a situation suitable for image transmission; and
perform selection processing of selecting an imaging device to be caused to transmit a captured image among a plurality of imaging devices on a basis of the situation determination processing, the situation including at least one of a power supply status, a failure status, or a recording medium status.

2. The information processing apparatus according to claim 1, wherein
the controller
performs the situation determination processing on an imaging device being selected as a device that performs captured image transmission, and
performs, in a case where it is determined that the imaging device is not in a situation suitable for image transmission, the selection processing such that the imaging device that performs image transmission is switched to another imaging device among the plurality of imaging devices.

3. The information processing apparatus according to claim 1, wherein
the controller makes an information request to the imaging device, and performs the situation determination processing on a basis of information transmitted from the imaging device in response to the information request.

4. The information processing apparatus according to claim 1, wherein
the controller performs the situation determination processing on a basis of notification information from an imaging device being selected as a device that performs captured image transmission.

5. The information processing apparatus according to claim 1, wherein
the controller
performs the situation determination processing on two or more imaging devices among the plurality of imaging devices, and
selects, in the selection processing, an imaging device to be caused to transmit a captured image from the plurality of imaging devices on a basis of the situation determination processing and designation information related to imaging.

6. The information processing apparatus according to claim 5, wherein
the designation information is information of a position as a subject.

7. The information processing apparatus according to claim 5, wherein
the designation information is information for designating an imaging target.

8. The information processing apparatus according to claim 1, wherein
in the situation determination processing, a situation of an imaging environment of the imaging device is determined.

9. The information processing apparatus according to claim 1, wherein
in the situation determination processing, a situation of a distance to an imaging target of the imaging device is determined.

10. The information processing apparatus according to claim 1, wherein
in the situation determination processing, a compatibility situation between a captured image of the imaging device and a communication speed is determined.

11. The information processing apparatus according to claim 1, wherein
in the situation determination processing, a situation of an imaging direction or an imaging angle of view of the imaging device is determined.

12. An information processing method for an information processing apparatus, the method comprising:
situation determination processing of determining whether or not a situation related to an imaging operation in an imaging device is a situation suitable for image transmission; and
selection processing of selecting an imaging device to be caused to transmit a captured image among a plurality of imaging devices on a basis of the situation determination processing, the situation including at least one of a power supply status, a failure status, or a recording medium status.

13. A non-transitory computer readable medium storing a program that causes an information processing apparatus to perform a set of operations comprising:
situation determination processing of determining whether or not a situation related to an imaging operation in an imaging device is a situation suitable for image transmission; and
selection processing of selecting an imaging device to be caused to transmit a captured image among a plurality of imaging devices on a basis of the situation determination processing, the situation including at least one of a power supply status, a failure status, or a recording medium status.

* * * * *